(12) United States Patent
Okawa et al.

(10) Patent No.: US 6,504,680 B2
(45) Date of Patent: *Jan. 7, 2003

(54) MAGNETIC HEAD AND MAGNETIC HEAD MANUFACTURING METHOD

(75) Inventors: Atsuko Okawa, Yokohama (JP); Yasuo Hira, Yokohama (JP); Hirotaka Imayama, Kawasaki (JP); Masayasu Fujisawa, Kanagawa (JP); Saburou Suzuki, Minamiashigara (JP); Eisei Togawa, Odawara (JP); Noriyuki Saiki, Odawara (JP); Nobuo Suzuki, Fujisawa (JP); Hiroshi Agari, Odawara (JP); Kiyoshi Akamatsu, Yokohama (JP); Hiromu Chiba, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/927,392

(22) Filed: Aug. 13, 2001

(65) Prior Publication Data

US 2002/0027746 A1 Mar. 7, 2002

Related U.S. Application Data

(63) Continuation of application No. 09/469,180, filed on Dec. 21, 1999, now Pat. No. 6,278,582, which is a continuation of application No. 08/952,470, filed as application No. PCT/JP96/01310 on May 17, 1996, now abandoned.

(30) Foreign Application Priority Data

May 17, 1995 (JP) .............................................. 7-141402

(51) Int. Cl.$^7$ ................................................. G11B 5/60

(52) U.S. Cl. .................................. 360/235.2; 360/236.7

(58) Field of Search .......................... 360/235.1, 235.2, 360/235.3, 235.8, 235.9, 236.6, 236.7; 29/603.07, 603.09, 603.12

(56) References Cited

U.S. PATENT DOCUMENTS

| 4,327,387 | A | * | 4/1982 | Plotto .......................... 360/122 |
|---|---|---|---|---|
| 5,159,508 | A | * | 10/1992 | Grill et al. ................ 29/603.12 |
| 5,175,658 | A | * | 12/1992 | Chang et al. ............. 360/234.5 |
| 5,198,934 | A | * | 3/1993 | Kubo et al. .................. 360/122 |
| 5,218,494 | A | | 6/1993 | Chapin et al. |
| 5,301,077 | A | * | 4/1994 | Yamaguchi et al. ...... 360/236.7 |
| 5,323,283 | A | | 6/1994 | Sano |
| 5,336,550 | A | * | 8/1994 | Ganapathi et al. ........... 360/120 |
| 5,491,605 | A | | 2/1996 | Hughbanks et al. |
| 5,612,839 | A | | 3/1997 | Jacques |
| 5,685,064 | A | | 11/1997 | Matsuzaki et al. |
| 5,768,055 | A | | 6/1998 | Tian et al. |
| 5,799,388 | A | * | 9/1998 | Shouji ...................... 29/603.09 |
| 5,910,864 | A | | 6/1999 | Hira et al. |
| 6,278,582 | B1 | * | 8/2001 | Okawa et al. ............ 360/235.2 |

FOREIGN PATENT DOCUMENTS

| JP | 60-9596 | 1/1985 |
|---|---|---|
| JP | 63-103406 | 5/1988 |
| JP | 63-317920 | 12/1988 |
| JP | 1-271169 | 10/1989 |

(List continued on next page.)

*Primary Examiner*—David L. Ometz
(74) *Attorney, Agent, or Firm*—Antonelli, Terry, Stout & Kraus, LLP

(57) ABSTRACT

A method of manufacturing a magnetic head slider for a magnetic head and the magnetic slider wherein the slider has non-linear rails formed in a floating surface thereof by processing including one of reactive ion etching, sputter etching and an ion milling, and side walls of the non-linear rails are polished after formation of the non-linear rails by the processing.

1 Claim, 20 Drawing Sheets

FOREIGN PATENT DOCUMENTS

| | | |
|---|---|---|
| JP | 2-199614 | 8/1990 |
| JP | 2-205479 | 8/1990 |
| JP | 4-188479 | 7/1992 |
| JP | 4-276367 | 10/1992 |
| JP | 5-109668 | 4/1993 |
| JP | 6-13357 | 1/1994 |
| JP | 5-290438 | 10/1994 |
| JP | 6-278016 | 10/1994 |
| JP | 7-29139 | 1/1995 |
| JP | 7-57231 | 3/1995 |
| JP | 7-98950 | 4/1995 |
| JP | 7-307070 | 11/1995 |

* cited by examiner

FIG. 4
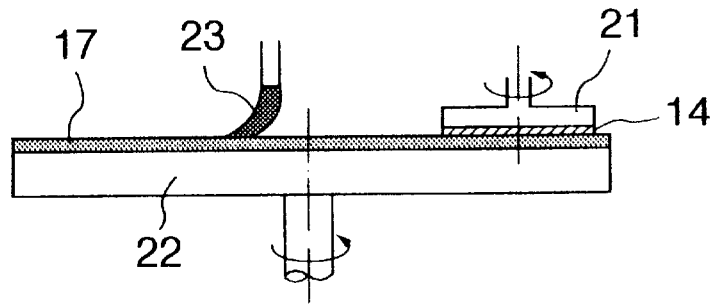
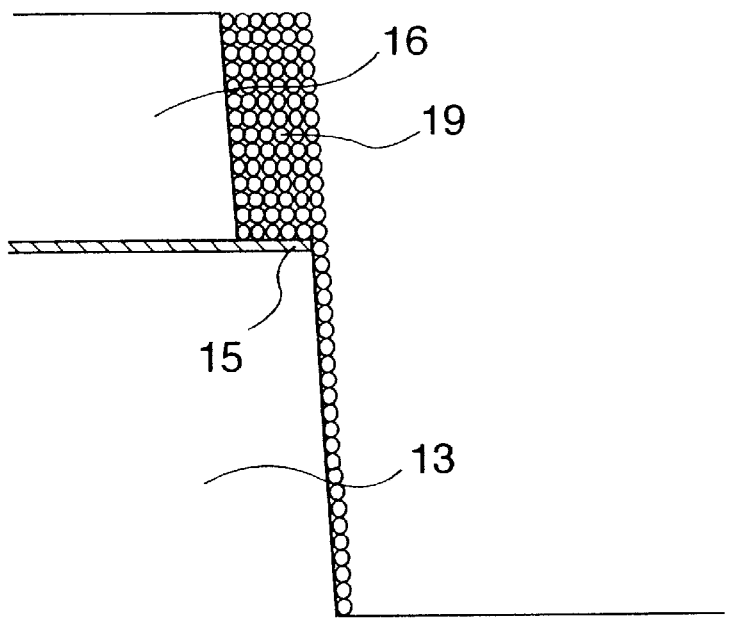
FIG. 5(a)
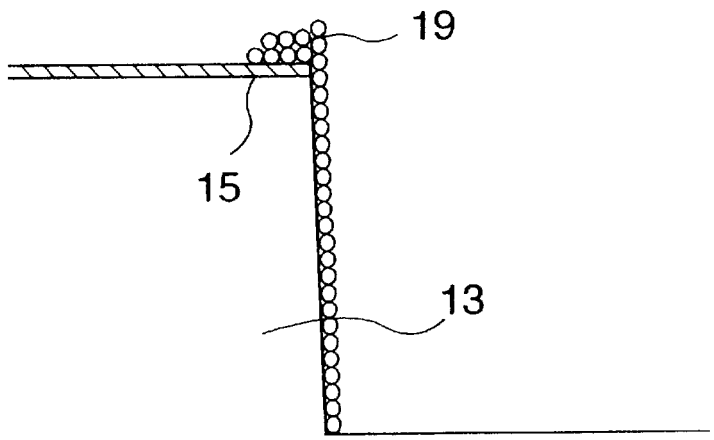
FIG. 5(b)

×50

NON-WOVEN POLYESTER FABRIC
(Baikalox)

×40

NON-WOVEN POLYESTER FABRIC
(BELLACE)

×30

SUEDE (Surfin)

MAGNETIC HEAD AND MAGNETIC HEAD MANUFACTURING METHOD

CROSS REFERENCE TO RELATED APPLICATIONS

This is a continuation of U.S. application Ser. No. 09/469,180, filed Dec. 21, 1999, now U.S. Pat. No. 6,278,582, which is a continuation of U.S. application Ser. No. 08/952,470, filed Feb. 6, 1998, now abandoned, which is a 371 of PCT/JP96/01310 filed May 17, 1996 the subject matter of which is incorporated by reference herein.

TECHNICAL FIELD

The present invention relates to a magnetic disk apparatus and manufacturing techniques therefor and in particular to a method of manufacturing a low flying height thin-film magnetic head having non-linear rails as well as the shape/structure of a magnetic head slider. More particularly, the present invention is concerned with a processing method of removing particulates re-deposited during a dry-etching process of ceramics and the like of a low etching rate and hence a thin-film magnetic head suited for ensuring stably a low flying height while preventing head crash and a method of manufacturing the same.

BACKGROUND ART

Recording density of the magnetic disk apparatus increases rapidly from year to year, which in turn brings about necessarily a demand for reduction in the flying height of the magnetic head. FIG. 10 is a view for illustrating a flying state of a magnetic head, wherein magnetic head 1 includes a floating surface 2, a tapered portion 4, a magnetic element 5, an air-stream entraps end 7 and an air-stream exit end 8 and is supported by a leaf spring 10. The floating surface 2 is formed with rails 3. When a magnetic disk is not rotated, the magnetic head 1 and the magnetic disk 11 are placed in the state where they are in contact with each other. When a rotation speed of the magnetic disk has attained a predetermined value, an air bearing slider mechanism is formed by an air stream 40 entering from the air-stream entrance end 7, flowing along the rails 3 and leaving the head from the air-stream exit end 8, whereby a floating force is generated and thus the flying height 12 is determined by coaction of a push-down force exerted by the leaf spring 10 an the floating force. It is one of the important problems to decrease not only the flying height 12 but also variation or difference in the flying height ascribable to difference between the peripheral velocities of inner and outer peripheries of the magnetic disk.

FIG. 11 is a view showing a conventional magnetic head slider known heretofore and a processing method for the same. The conventional magnetic head slider is provided with linear rails 3 which are formed heretofore by a machining process carried out by using a grinding wheel 27. FIG. 14 shows relations between the peripheral velocity and the flying height. In the case where the linear rails are employed, the flying height is within a range of ca. 140 to 200 nm when the disk is operated at the peripheral velocity ranging from 15 to 35 m/s, wherein difference of the flying height between the inner and outer peripheries of the disk amounts to ca. 60 nm, which means that the flying height has a great dependency on the peripheral velocities. Furthermore, in the case where the linear rails are employed, the width of the rail and the flying height bear a proportional relation to each other, and it is desirable to decrease the rail width in order to reduce the flying height. However, in the portion at which the magnetic elements 5 are formed, as can be seen in FIG. 11, the rail width needs to accommodate the width of the magnetic element 5. Consequently, limitation is necessarily imposed onto the diminution of the rail width.

Such being the circumstances, an inclined surface referred to as the chamfered portion is formed at each of corner portions of the rails 3 along which the aforementioned air stream flows in an effort to realize reduction of the flying height as well as suppression of the variation thereof, as is disclosed in U.S. Pat. No. 4,673,996. The inclined surface is so implemented that the angle formed relative to the floating surface is from 0.5 degree to 2 degrees and that the ratio of the area occupied by the chamfered portion to the area of the rail is from 12.5 to 22.5%. As an example of the chamfered portion, there can be mentioned one having a width on the order of 10 $\mu$m and a height of 2 $\mu$m.

Furthermore, by decreasing the width of a portion of the rail 3, reduction of the flying height as well as suppression of the variation thereof is realized, as is disclosed in Japanese Unexamined Patent Application Publication No. 103406/1988. Additionally, by providing at a corner portion of the rail 3 along which the air stream flows an inclined surface having a width increasing gradually from the entrance end toward the exit end, reduction of the flying height as well as suppression of the variation thereof is realized, as is disclosed in Japanese Unexamined Patent Application Publication No. 188479/1992. By providing the chamfered portion in this manner, t he flying height can be reduced so as to fall within a range of ca. 80 to 120 nm at the peripheral velocity of 15 to 35 m/s and at the same time the variation or difference in the flying height between the inner and outer peripheries of the disk is suppressed to ca. 40 nm.

In recent years, as the most effective means for reducing the flying height, there are increasingly adopted a method of using the rails of non-linear shape, as is disclosed in Japanese Unexamined Patent Application Publication No. 276367/1992. An example of the magnetic head having the non-linear rails is shown in FIG. 12. In the case where the non-linear rails of this type are employed, the flying height can be suppressed to a low level within a range of ca. 60 to 75 nm when the disk is operated at the peripheral velocity ranging from 15 to 35 m/s, wherein difference of the flying height between the inner and outer peripheries of the disk is reduced to ca. 15 nm, as can be seen in FIG. 14. The rails of the non-linear shape can ensure the flying height reducing effect equivalent to or more than that attained by the structure in which the chamfered portion is formed in the linear rail, as described above, and is very effective particularly for suppressing the variation of the flying height ascribable to the difference in the peripheral velocity between the inner and outer peripheries of the disk. Accordingly, by forming the chamfered portion in the rail of the non-linear shape which by itself exhibits the desired effect equivalent to or more than the linear rail provided with the chamfered portion, it is expected that the floating characteristic can further be enhanced. Thus, in view of the flying height and the excellent stability as realized, it is necessarily required to distinguish strictly the rail of the linear shape provided with the chamfered portion and the rail of the non-linear shape provided with the chamfered portion from each other. In the current state of the art, the structure in which the rail of the non-linear shape is provided with the chamfered portion is not known. By employing the rail of the non-linear shape, there can be achieved sufficiently the effects of reducing the flying height and suppressing the variation of the flying height, and it is expected that the floating characteristic can further be improved by providing a minute chamfered portion, which in turn however means that realization of optimal geometry of the chamfered portion requires fine and high-precision process when compared with the head having the rails of the linear shape.

In addition to the floating characteristic improving effect described above, provision of the chamfered portion can provide the additional effects mentioned below, as disclosed in Japanese Unexamined Patent Application Publication No. 9656/1985. As can be seen in FIG. 10, the flying height at the air-stream exit end 8 is small when compared with the flying height at the airstream entrance end 7, and thus the air-stream exit end 8 is more likely to contact the magnetic disk 11. For this reason, it is desired that the geometry of the air-stream exit end 8 of the magnetic head 1 be smooth for protecting not only the magnetic disk 11 but also the magnetic head itself against injury. To this end, the chamfered portion is provided. In order to realize the effects mentioned above with the rails of the non-linear shape, there-is demanded realization of the non-linear rails strictly with high precision as described hereinbefore in conjunction with the effect affecting the floating characteristics.

A process for fabricating a magnetic head having rails of non-linear shape will be elucidated by reference to FIG. 13. After forming the magnetic element 5 in a substrate of the alumina titanium carbide 13, a typical substrate material, the substrate is cut into head blocks 14 each including a plurality of sliders, whereon the floating surface 2 is formed by grinding or polishing to a predetermined dimension (a), a protecting film 15 is formed on the floating surface by sputtering, CVD or the like process (b), resist 16 serving as a mask for forming the rails is applied, a resist pattern is formed through lithography (c), rails are then formed on the floating surface through an etching process (d) and (e), and the product is then cut into individual sliders (f) to realize magnetic heads 1' such as shown in FIG. 12. Because the step (d) of forming the rails on the floating surface can not be carried out by the conventional machining process using a grinding wheel due to the non-linear shape of the rail, there is ordinarily adopted the etching process such as reactive ion etching, plasma etching, sputter etching and ion milling etching process. Since alumina titanium carbide forming the substrate has a very low reactivity with the etching gas, the etching process is realized primarily by resorting to a physical removal effect based on high-energy ion impact. Consequently, all the particulates sputtered by the physical etching are not always sucked into the vacuum pump but some part of the sputtered particulates is deposited on the mask material and side walls of the alumina-titanium-carbide substrate, as is illustrated in FIG. 5 at (a). This phenomenon will be referred to as the re-deposition. The re-deposited particulates 19 remain in the form of projections even after the removal of the resist 16 serving as the mask, as shown in FIG. 5 at (b). To remove such re-deposition, there is disclosed in Japanese Unexamined Patent Application Publication No. 109668/1993 a method of eliminating the re-deposition by changing the angle at which an argon ion beam impinges onto the substrate during the processing, as is disclosed in Japanese Unexamined Patent Application Publication No. 109668/1993. According to this method, the etching process is carried out at first with the argon ion beam with the angle of incidence which is not greater than 5 degrees and subsequently the re-deposited particulates are removed by setting the angle of incident of the ion beam at least at 30 degrees. Further, in Japanese Unexamined Patent Application Publication No. 13357/1994, there is disclosed a method of removing the re-deposited particulates by carrying out an isotropic plasma etching in succession to the ion milling process.

When the re-deposition takes place in the course of processing of the magnetic head slider, the re-deposited particulates will remain on the floating surface of the slider rail of the magnetic head notwithstanding of removal of the mask material after the etching process, giving rise to problems that the magnetic disk may be injured by the re-deposited particulates upon starting and stopping of the magnetic head, the re-deposited particulates may fall during operation of the magnetic disk apparatus, providing a cause for fault and so forth. Besides, in view of the fact that the flying height decreases from year to year, the height of the re-deposition as measured from the floating surface may become comparable to the flying height, exerting severe influence to the very floating performance of the magnetic head. Under the circumstances, there has arisen a demand for development of the process for the elimination of the re-deposition.

Although the conventional method of eliminating the re-deposition by changing the angle of incidence of the argon beam as described hereinbefore is one of the most effective methods for the elimination of the re-deposition, it is impossible to eliminate the re-deposition in the etching process carried out by resorting to the ion milling or the like of ceramics such as alumina titanium carbide, the typical material for the substrate of the magnetic head slider, the reason for which will be described below. Referring to FIG. 21, formation of time re-deposition will be described in the case where the ion milling process is performed for the alumina-titanium-carbide substrate by using an argon gas with a resist being used as the mask material. FIG. 21 is a conceptual view illustrating the formation of the re-deposition, in which reference numeral 16 denotes the resist, 13 denotes an alumina-titanium-carbide substrate, 19 and 19a denote re-deposited particulates, and 39 denotes an ion beam. When the resist 16 and the alumina-titanium-carbide substrate 13 are irradiated with the ion beam, omission of fine particles or particulates of respective materials takes place under the effect of bombardment of ions. Some of the fine particulates as emitted are suspended in the atmosphere within the vacuum chamber to be ultimately discharged into a vacuum pump, while some of the particulates collide against the surfaces of the resist and the alumina-titanium-carbide substrate. Some of the fine particles or particulates colliding against the surfaces of the resist and the alumina-titanium-carbide substrate will remain on these surfaces, being deposited, while some of the fine particulates will be emitted again, wherein the probability of the deposition depends on the processing conditions such as energy of the ion beam, species of the materials to be processed and others. It is believed that in the case of the process in which the ion beam of high energy is employed as in the case of the ion milling, the deposition likelihood is high, approximating to 1 (one). Consequently, in the course of the processing, fine particles or particulates of the alumina-titanium-carbide substrate or the resist or mixture of these two materials will constantly exist, being deposited on the surfaces of the resist and the alumina-titanium-carbide substrate.

At this juncture, ion milling rates for alumina titanium carbide and the resist are illustrated in FIG. 22. The ratio of the ion milling rate for the resist to the ion milling rate for the alumina-titanium-carbide substrate (hereinafter this ratio will be referred to as the selection ratio) lies within a range of ca. 0.3 to 0.5, although this ratio will change in dependence on the angle of incidence of the ion beam, which means that the processing rate for the resist is always as high as twice to three times of the processing rate for alumina-titanium-carbide substrate. Consequently, when the re-deposited particulates 19 of alumina titanium carbide adhere to the side wall of the resist, as can be seen in FIG. 21, the portion of the resist covered by the re-deposited particulates 19 undergoes the ion milling at lower rate when compared with the surrounding resist portion, resulting in formation of concave/convex surface. When deposition of the fine particles or particulates on the concave/convex surface is repeated, a re-deposition layer is formed, as can be seen in FIG. 5 at (a).

Since the method described above is so designed as to eliminate the re-deposition by increasing the energy of the ion beam incident on the side walls of the resist and the material being processed by changing the angle of incidence of the ion beam, it must be possible to increase the incidence angle of the ion milling on the way of the ion milling for processing the alumina-titanium-carbide substrate. When the incidence angle of the ion beam is selected greater than 60 degrees inclusive, the rate at which the re-deposited particulates on the side walls are etched becomes higher than the rate at which the re-deposition occurs on the side walls. Accordingly, the re-deposited particulates must theoretically be re moved. However, in the case of the processing for the alumina-titanium-carbide substrate, concaves/convexes, i.e., roughness such as illustrated in FIG. 23 at (b), make appearance in the side wall, because of significant difference in the processing rate between the alumina-titanium-carbide substrate and the resist, as described hereinbefore. The re-deposited particulates 19a adhering to the concave portions forming in part the roughness can never be removed because the re-deposited particulates are not exposed to the ion beam unless the incidence angle of the ion beam is set at 90 degrees or more. However, when the incidence angle of the ion beam is set higher than 90 degrees inclusive, the whole side walls will then be located within a shadow area of the resist, being not exposed to the ion beam. Consequently, the ion beam can not impinge onto the side wall. Such processing conditions are impracticable.

The roughness of the side wall can be explained by the fact that the selection ratio between the resist and the alumina-titanium-carbide substrate is poor. If this selection ratio is on the order of 1 (one), neither the roughness nor the re-deposition can take place. However, at present, the resist permitting such low processing rate which is substantially equal to that of alumina-titanium-carbide is unavailable. In the conventional alumina titanium carbide processing known heretofore, the incidence angle of the ion beam is initially set at 45 degrees with the processing rate also being set high, and when the processing proceeds to the state-approaching a desired processed state, the incidence angle is set at 75 degrees for performing the removal of the re-deposited particulates. When the processing is performed with the incidence angle set at 45 degrees, a significant amount of the re-deposited particulates can be observed on the side walls of the resist and the alumina-titanium-carbide substrate, as is shown in FIG. 23 at (a), while in the processing with the incidence angle of the ion beam set at 75 degrees, a large part of the re-deposited particulates can be removed, as is illustrated in FIG. 23 at (b). However, for the reason mentioned hereinbefore, some part of the re-deposited particulates will yet remain in the adhering state, and even after the removal of the resist, a very small amount of re-deposited particulates continues to remain unremoved, as is illustrated in FIG. 23 at (c). The minute amount of re-deposition which can not be eliminated even when the incidence angle of the ion beam is changed in the ion milling process presents a serious problem, and there exists a demand for developing the method capable of removing the minute amount of re-deposited particulates.

On the other hand, the method of eliminating the re-deposition by resorting to the use of isotropic plasma etching is primarily for a thin-film process and effective for a semiconductor process for which a relatively small amount of processing is required. However, the amount of processing involved in fabrication of the magnetic head slider is large and at the same time the amount of the re-deposition is equally large. Thus, the above-mentioned method takes an increased time for forming the magnetic head slider. Besides, it is noted in conjunction with the magnetic head slider that the rail width and the groove depth bear close relation to the flying height. Consequently, very severe precision requirement is imposed on the processing. In this conjunction, it is noted that with the isotropic etching process which allows a relatively large amount of material to be etched away from the side wall, not only variation in size but also in the shape is remarkable. Thus, the isotropic etching process can not be applied for forming the magnetic head slider.

Thus, there exists a demand for developing a re-deposition eliminating method which is capable of eliminating completely the re-deposition not only from the floating surface but also from the side wall portions of the rails and which can assure negligibly small dimensional deviations of the rail.

By adopting the rails of the non-linear shape, the flying height can be reduced and at the same time variation or difference in the flying height ascribable to the difference in respect to convergence degree between the inner and outer peripheries of the magnetic disk can be mitigated. However, for further enhancing or improving the floating characteristics, it is preferred to form an extremely chamfered portion at the corner portion of the rail. Besides, in order to mitigate the shock which may occur upon starting/stopping of the magnetic disk rotation, it is desirable to form the chamfered portion at the air stream exit end as well. The size of these chamfered portions is small on the order of one tenth of the chamfered portion formed in the rail of the linear shape in the conventional magnetic head, which requires extremely high processing precision. In the linear-shaped rail of the magnetic head known heretofore, such chamfered portion is formed by resorting to grinding and tape polishing. However, in the case of the rail of the non-linear shape, such processing techniques will encounter great difficulty in forming the chamfered portion. Such being the circumstances, there also exists a demand for developing a processing technique for forming the chamfered portion in the rail of the non-linear shape with high precision or accuracy.

DISCLOSURE OF INVENTION

For solving the problems mentioned above, it is taught according to the present invention that a polishing process is performed after forming the rails of non-linear shape on a floating surface by an etching process. In the polishing process, polishing liquid containing abrasive grains or polishing liquid containing no abrasive grains br water may be used as polishing liquid has been found that the polishing carried out by using a polishing cloth and more preferably non-woven polyester fabric is effective.

By carrying out the polishing process after forming the rails of the magnetic head slider by resorting to the etching process, all the re-deposited particulates adhering to the side walls of the rails and the resist can be removed. Such satisfactory removal of the re-deposited particulates can be ensured to be effective in any of the case where the polishing liquid containing the abrasive grains or the polishing liquid containing no abrasive grains or water is employed as the polishing liquid. Such effect is very significant in particular when the non-woven polyester fabric is used as the polishing cloth. By virtue of the complete removal of the re-deposited particulates through the polishing, injury of the magnetic disk which may otherwise be caused by the re-deposited particulates as well as unwanted phenomenon that the re-deposited particulates dropped off onto the magnetic disk provides obstacle to the read/write operation can be positively prevented from occurrence, whereby the magnetic disk apparatus ensuring high reliability can be realized for practical applications. Furthermore, a chamfered portion formed by a minute inclined surface or curved surface may be provided at a corner portion of the rail. Owing to the provision of such chamfered portion, the flying height as well as the variation thereof can be reduced. By forming the chamfered-portion at the air-stream entrance end 7 as well, shock to which the magnetic disk is subjected to upon starting/stopping of operation thereof can be mitigated.

BRIEF DESCRIPTION OF DRAWINGS

FIG. 4 is a conceptual view showing a re-deposited particulate removing polishing process according to the present invention, FIG. 5 is an enlarged sectional view showing a magnetic head slider according to a first exemplary embodiment.

BEST MODES FOR CARRYING OUT THE INVENTION

Figure 1A:
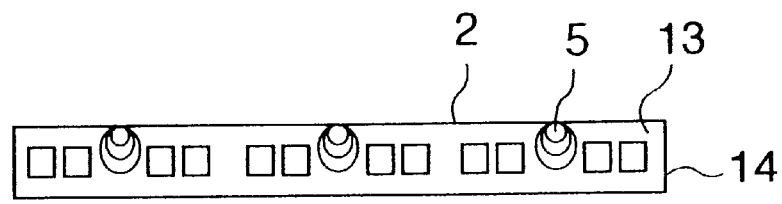
FIG. 1 is a view illustrating a method of manufacturing a magnetic head slider according to the present invention.
Figure 1B:
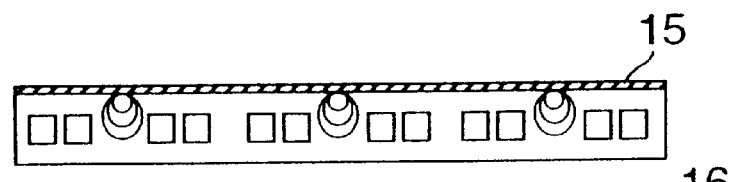
Figure 1C:
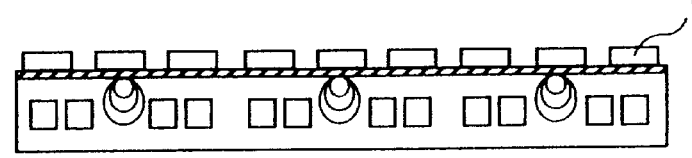
Figure 1D:
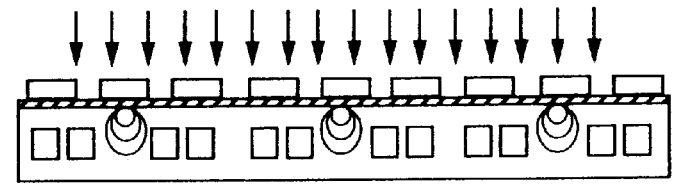
Figure 1E:
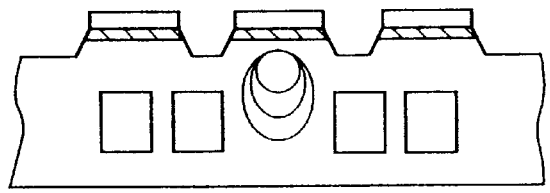
Figure 1F:
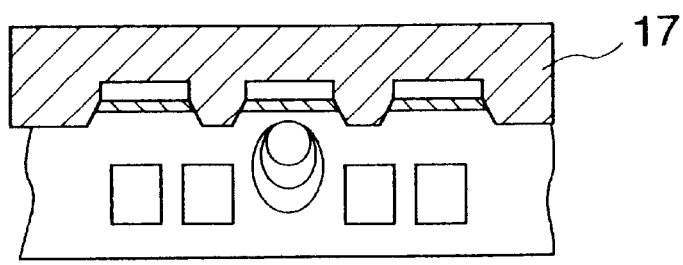
Figure 1G:
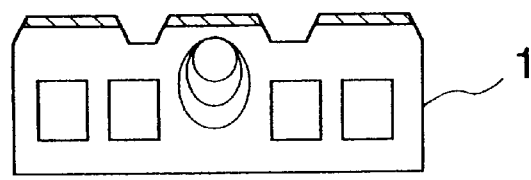

In the following, the present invention will be described in detail in conjunction with exemplary embodiments shown in the drawings.

Exemplary Embodiment 1

Figure 2:
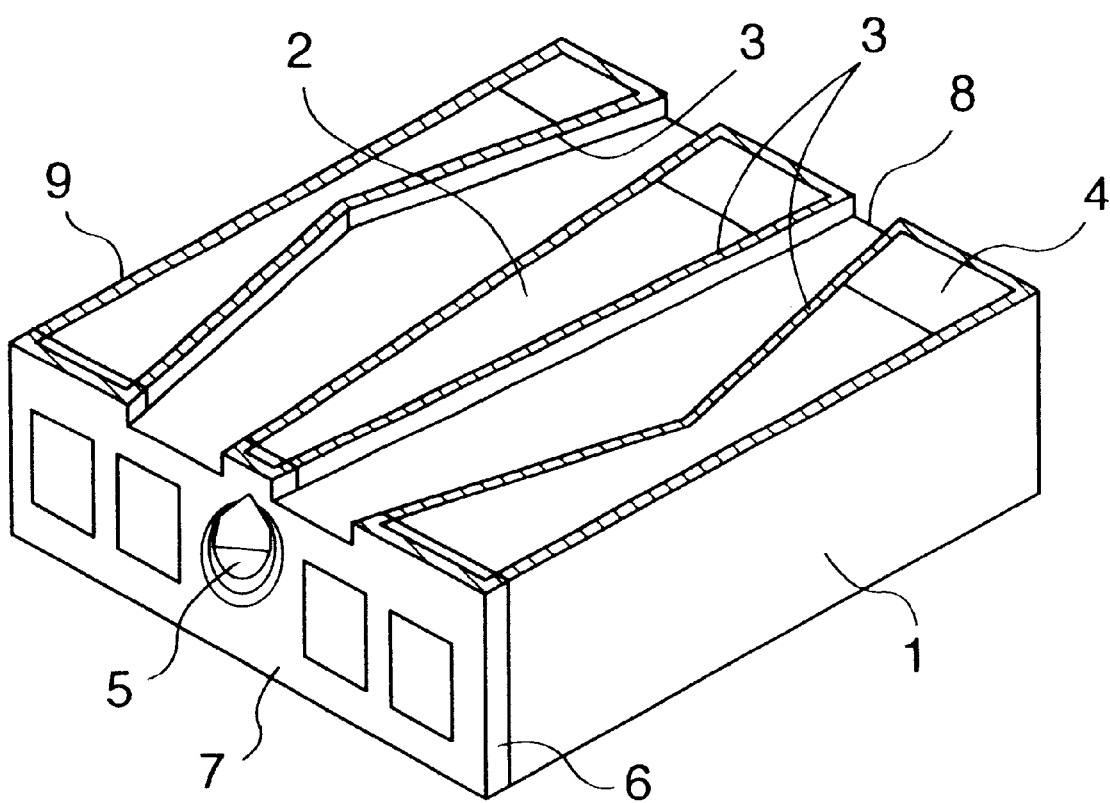
FIG. 2 is a view showing a magnetic head slider according to the present invention.

A first exemplary embodiment of the present invention will be described by reference to FIGS. 1 to 9 and FIG. 19. FIG. 2 is a conceptual view showing generally a magnetic head 1 fabricated according to the teachings of the present invention. The magnetic head 1 according to the present invention includes a floating surface 2, rails 3 of non-linear shape formed on the floating surface, tapered portions 4, a magnetic element 5, an element forming portion 6, an air-stream entrance end 7, and an air-stream exit end 8, wherein a minute inclined surface 9 is formed at a corner portion of each of the rails 3.

A process for manufacturing or fabricating the magnetic head slider according to the present invention will be described by reference to FIG. 1, FIG. 3, FIG. 4, FIG. 8, FIG. 9 and FIG. 19.

Figure 3A:
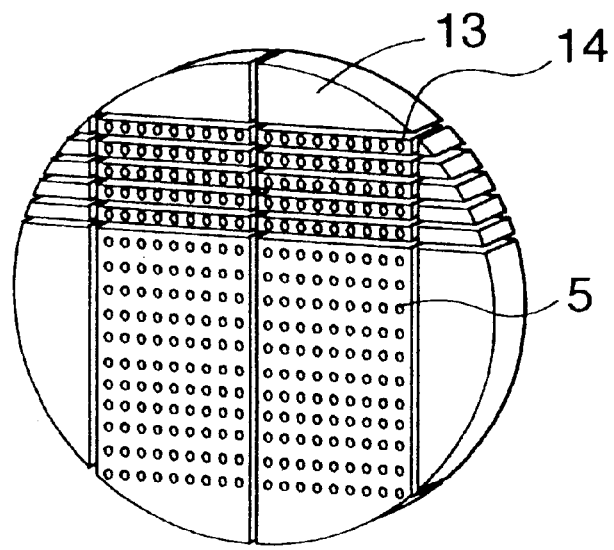
FIG. 3 is a view illustrating a method of manufacturing a magnetic head slider according to the present invention.
Figure 3B:
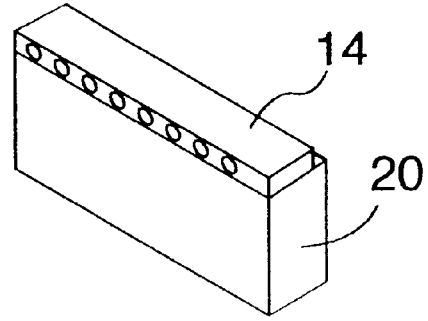
Figure 3C:
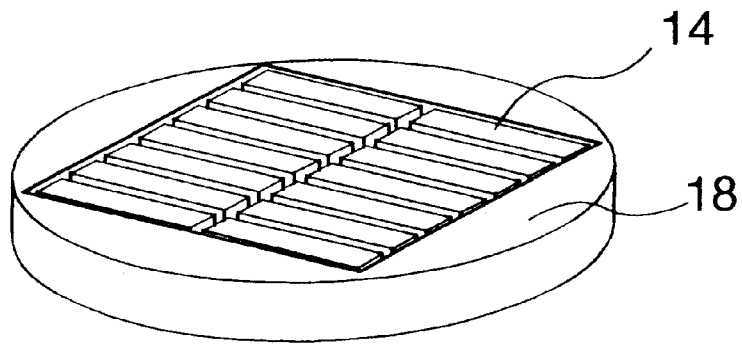

As is shown in FIG. 3, after the magnetic elements have been formed in an alumina-titanium-carbide substrate 13, a plurality of head blocks 14 are formed by cutting the substrate into blocks each of a predetermined size, whereon the head blocks are fixedly mounted on a head block polishing jig 20 to perform polishing for thereby forming the floating surface 2. Subsequently, the head blocks 14 are disposed in arrays on a head block fixing jig 18. A side elevational view of the block as viewed from the side of the magnetic element is shown in FIG. 1 at (a). A protecting film 15 is formed on the floating surface 2 by sputtering, CVD or the like process (b), resist 16 is applied and a mask for manufacturing the rails is formed through lithography (c), the rail pattern of the resist are transferred to the alumina-titanium-carbide substrate by employing the resist 16 as the mask material through an etching process, for example, the ion milling process using an argon gas (d).

Figure 19:
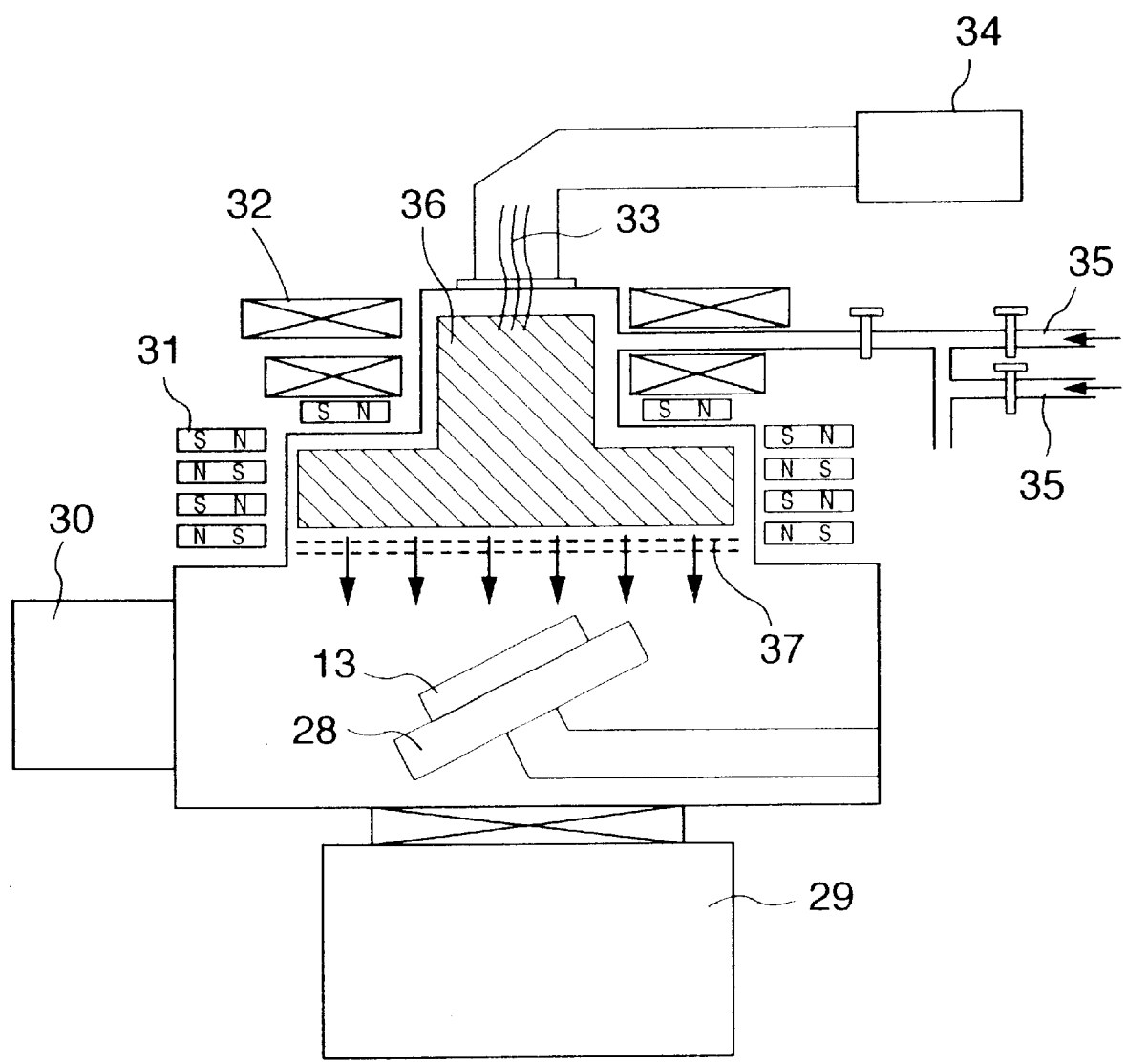
FIG. 19 is a diagram showing a structure of an ion milling apparatus.

FIG. 19 is a schematic diagram showing an ion milling apparatus known heretofore. In FIG. 19, numeral 13 denotes an alumina-titanium-carbide substrate, 28 denotes a specimen holder, 29 denotes a vacuum pump, 30 denotes a specimen exchanging chamber, 31 denotes a permanent magnet, 32 denotes a solenoid coil, 33 designates microwave, 34 denotes a microwave oscillator, 35 denotes a gas introducing port, 36 designates plasma, and 37 denotes pull-out electrodes. In the apparatus now concerned, an ion milling gas is supplied through the gas introducing port 35, while excitation of the plasma 36 being effectuated by the microwave 33, and ions are drawn out by the pull-out electrodes 37 under acceleration for thereby irradiating the specimen for the processing thereof.

By way of example, the ion milling may be carried out under the conditions mentioned below. Argon is used as the ion milling gas, the flow rate is 10 sccm, vacuum is 0.2 Pa, the beam current density is 0.8 mA/cm$^2$, the accelerating voltage is 900 V, the beam incidence angle is 45° and the process time is 480 minutes. The groove depth of tho rail 3 formed in this manner is ca. 10 μm (e). The sectional shape of the rail thus formed is shown in FIG. 5 at (*a*). The re-deposited particulates 19 exist over the whole side walls of the alumina-titanium-carbide substrate and the resist.

Accordingly, the polishing process as shown in FIG. 1 at (*f*) is performed by using the polishing cloth 17 in succession to the ion milling to thereby remove the re-deposited particulates produced in the course of the ion milling. The polishing process in this conjunction will be elucidated below.

FIG. 4 is a conceptual view showing a polishing process of the head block 14. In FIG. 4, reference numeral la denotes the head block mounted fixedly on a head block fixing jig 18, numeral 21 denotes a rotatable chuck, 17 denotes a polishing cloth pasted over the rotatable turn table 22, and numeral 23 denotes a polishing liquid.

A process for removing the re-deposited particulates produced in the course of the ion milling by resorting to a re-deposited particulate removing polishing process according to the invention will be described by reference to FIG. 4. As can be seen in FIG. 4, the head blocks 14 secured to the head block fixing jig 18 is mounted on the chuck 21 and placed on a surface of the rotating polishing cloth 17 to be thereby caused to move slidingly and oscillationally in the radial direction of the turn table 22 while being pressed against the polishing cloth 17 onto which the polishing liquid 23 is supplied.

The polishing process may be carried out, by way of example, under the conditions mentioned below.

Figure 24A:
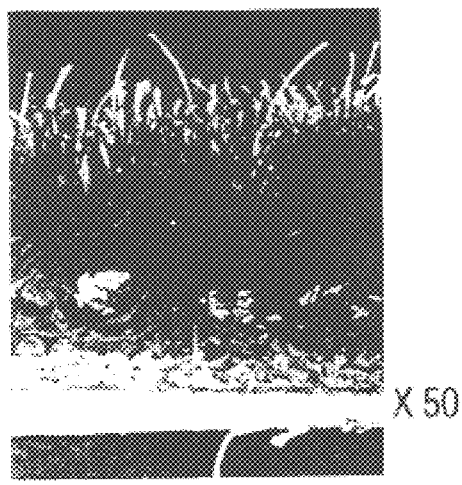
FIG. 24 shows SEM photographs of polishing clothes.
Figure 24B:
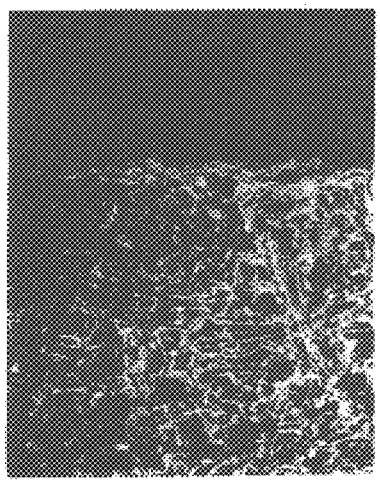
Figure 24C:

The turn table 22 and the polishing cloth 17 have respective diameters of 300 mm, the chuck 21 and the turn table 22 are rotated in the same direction at a speed of 20 rpm, the chuck 20 is oscillated with an amplitude or width of 10 mm at the oscillation speed of 5 mm/sec, the polishing pressure as applied is 10 kPa, the mean polishing rate is 80 mm/sec, non-woven polyester fabric is used as the polishing cloth 17, and a slurry containing diamond grains having particle size of 0.25 μm on an average is used as the polishing liquid 23 and dropped or supplied at a rate of 10 ml/min. The polishing time is 10 minutes. The non-woven polyester fabric used in carrying out the invention may be, for example, one commercially available under the trade name "suba 400" (from Rodel Nitta Co.) or "Bakalox CA" (from Baikalox Co.) or "BELLACE" (from Kanebo Ltd.) or the like having a surface of a rough nap structure, as can be seen from SEM photographs shown in FIG. 24 at (*a*) and (*b*). The non-woven polyester fabric features high susceptibility to deformation when compared with polishing cloth known as "suedecloth" formed of foamed polyurethane such as shown in FIG. 24 at (*c*).

Figure 25:
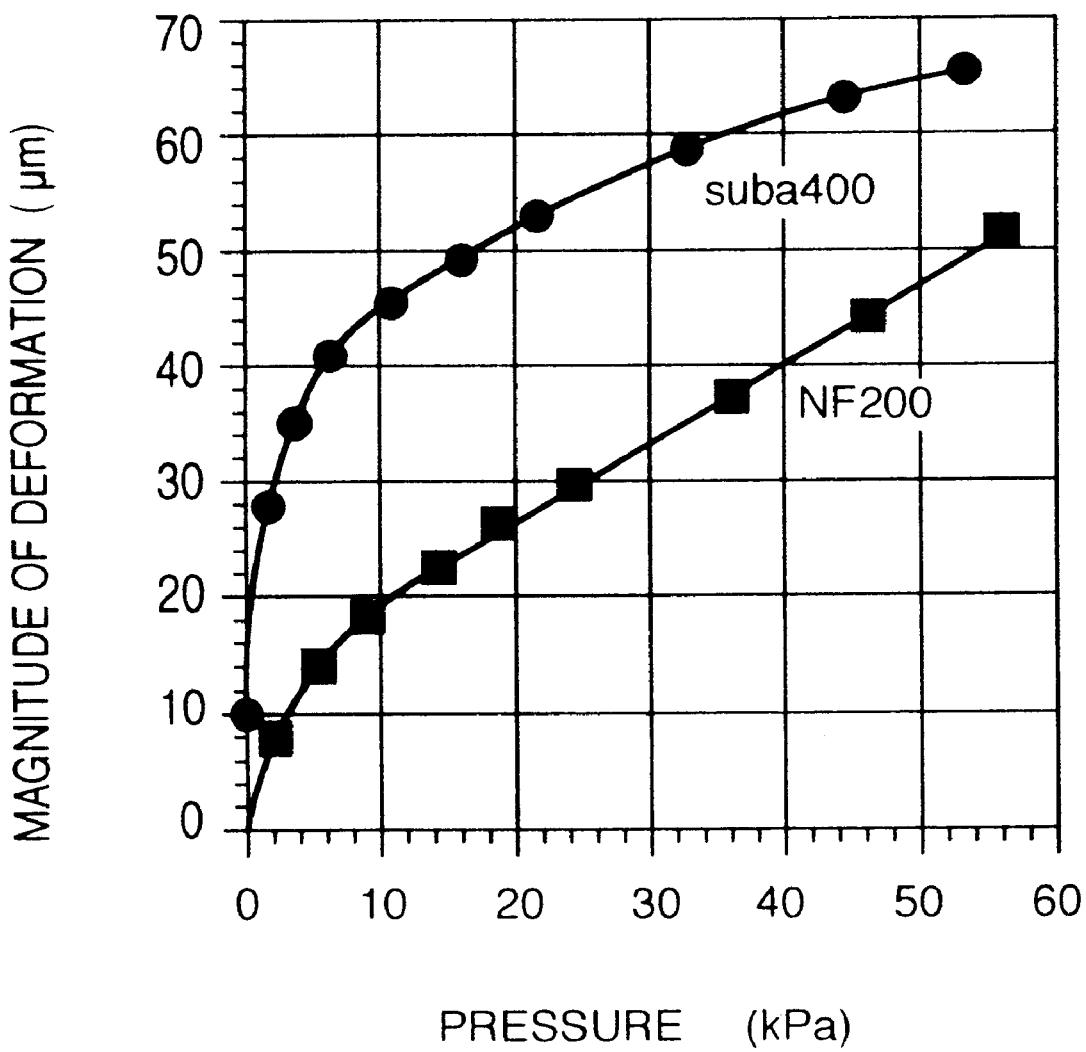
FIG. 25 is a view illustrating relations between pressures and magnitudes of deformation of polishing clothes.

FIG. 25 is a view illustrating relations between pressures and magnitudes of deformation of polishing clothes. As can be seen, the non-woven polyester fabric "Subla 400" undergoes remarkable deformation under a low load when compared with suede "NF200". In carrying out the re-deposited particulate removing polishing process according to the invention, it is desirable to use the non-woven polyester fabric which is easy to deform, because what is important is that the polishing cloth can be deformed so as to be brought into sufficient contact with the side walls of the rails formed through the ion milling process, for thereby removing all the re-deposited particulates. Under the polishing conditions mentioned previously, the non-woven polyester fabric-is caused to deform sufficiently, whereby the polishing process is performed in the state in which the non-woven polyester fabric is placed in contact with the side walls of the resist and the rail, as shown in FIG. 1 at (*f*).

Figure 6:
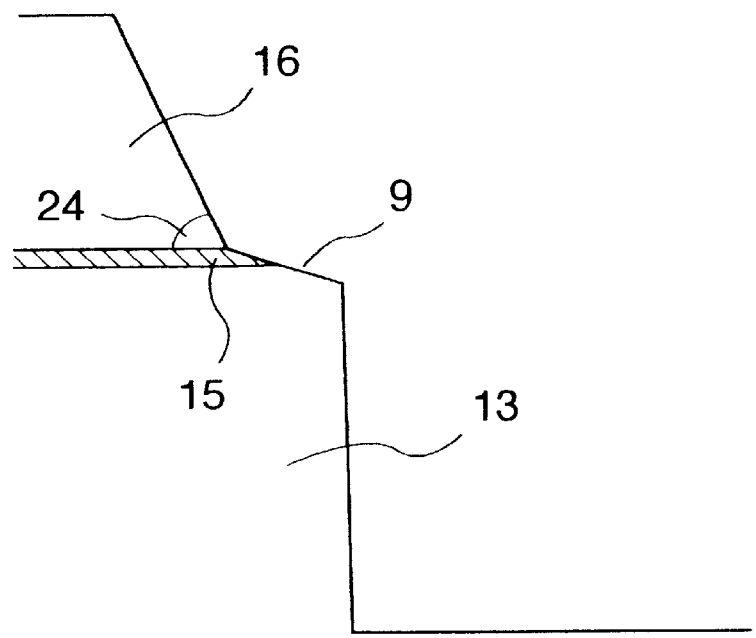
FIG. 6 is an enlarged sectional view showing the magnetic head slider according to the first exemplary embodiment.
Figure 6:
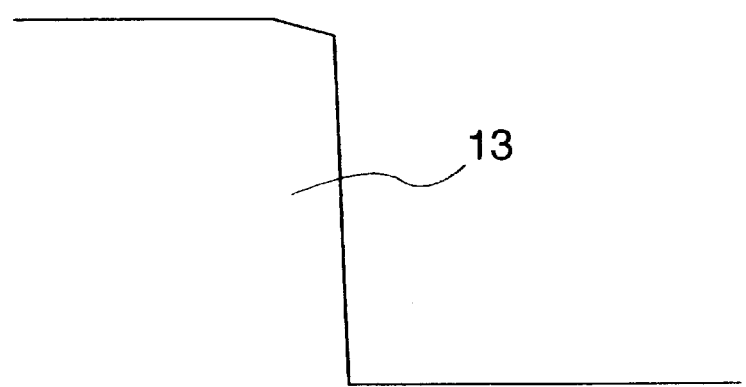
Figure 6:
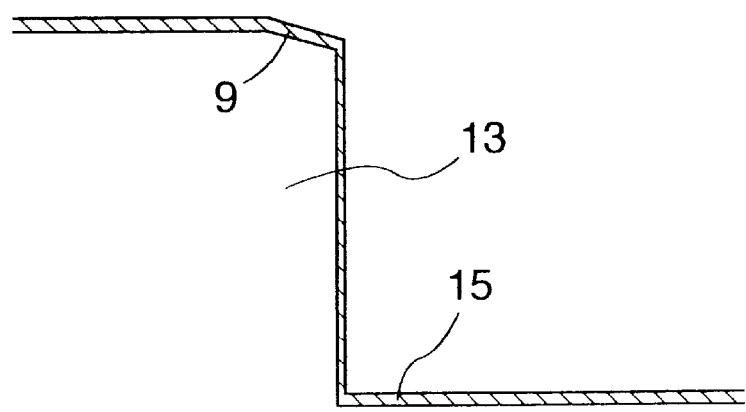
Figure 7A:
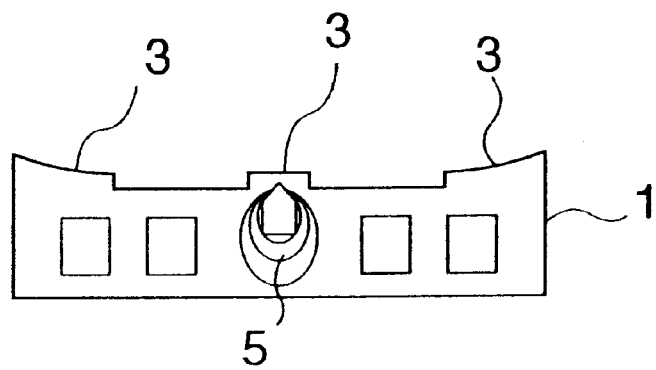
FIG. 7 is a side elevational view showing the magnetic head slider according to the first exemplary embodiment.
Figure 7B:
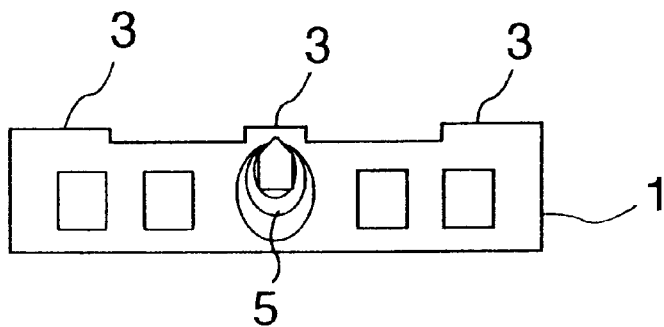

A sectional shape of the rail undergone the above-mentioned re-deposited particulate removing polishing process is shown in FIG. 6 at (*a*). Comparison with the state before the polishing as shown in FIG. 5 at (*a*) shows that the re-deposited particulates are removed away perfectly, the angle 24 formed between the side wall of the resist and the substrate surface (hereinafter this angle will be referred to as the taper angle) becomes smaller when compared with the taper angle before the polishing with the resist being retracted from the position before the polishing. Further, a minute inclined surface 9 is formed at an edge surface or corner portion of the rail and has a size of ca. 1 μm in width with the height being ca. 0.5 μm. However, the width and the groove depth of the rail undergo no change when compared with those before the polishing. After the re-deposited particulate removing polishing process, the resist is removed, and the block is delaminated from the head block fixing jig, whereon the block is cut into individual magnetic heads 1 shown in FIG. 1 at (*g*). At this time point, the floating surfaces 1 of the individual magnetic heads are deformed a little to a concave shape, as can be seen in FIG. 7 at (*a*), due to strain encountered in mounting on the jig or due to-stress encountered during the film formation. The magnitude of such deformation is about 0.25 μm. A flatness correcting polishing process for correcting or compensating the above-mentioned deformation will be described below by reference to FIG. 8.

Figure 8:
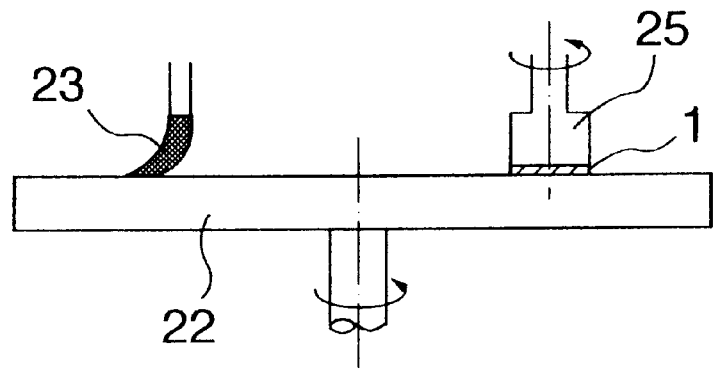
FIG. 8 is a conceptual view showing a flatness correcting polishing process.
Figure 9:
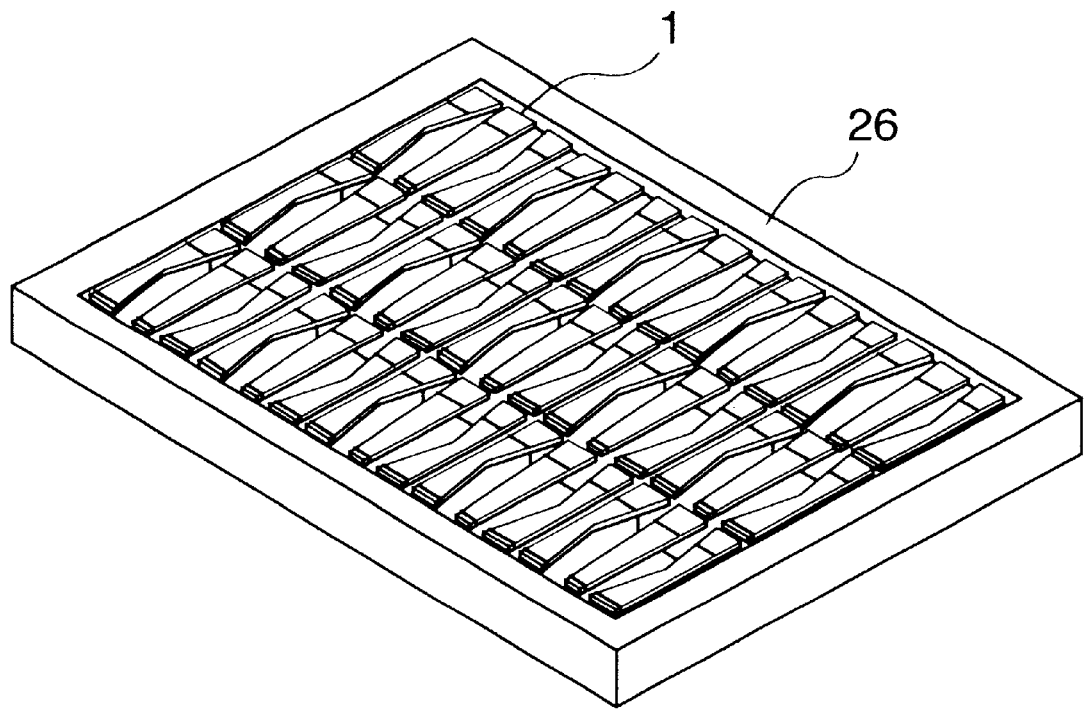
FIG. 9 is a view illustrating a method of manufacturing a magnetic head slider according to the present invention.
Figure 10:
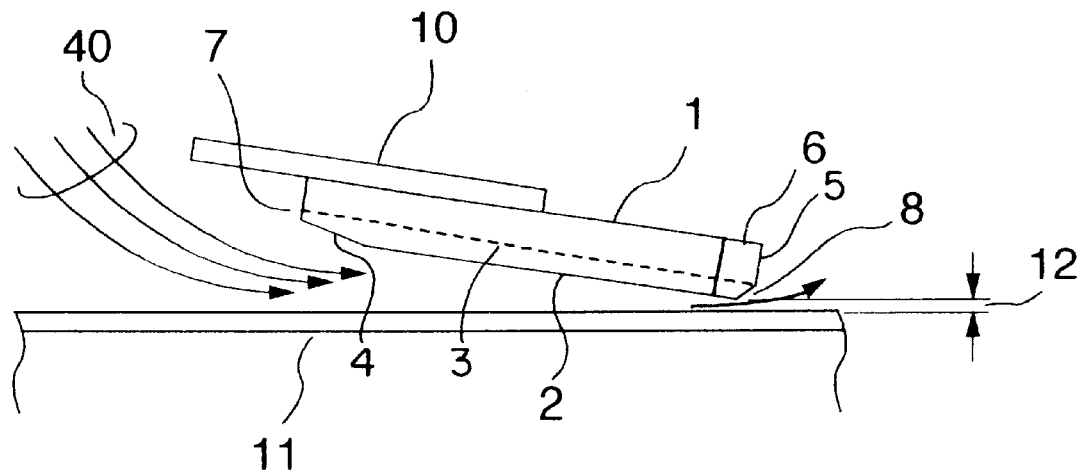
FIG. 10 is a view for illustrating a floating state of a magnetic head.
Figure 11:
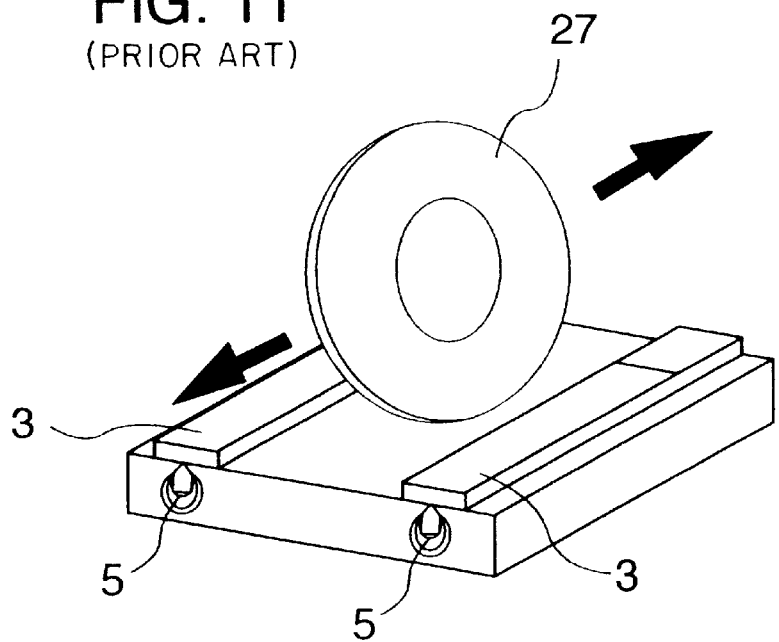
FIG. 11 is a view showing a conventional magnetic head slider known heretofore and a processing method for the same.
Figure 12:
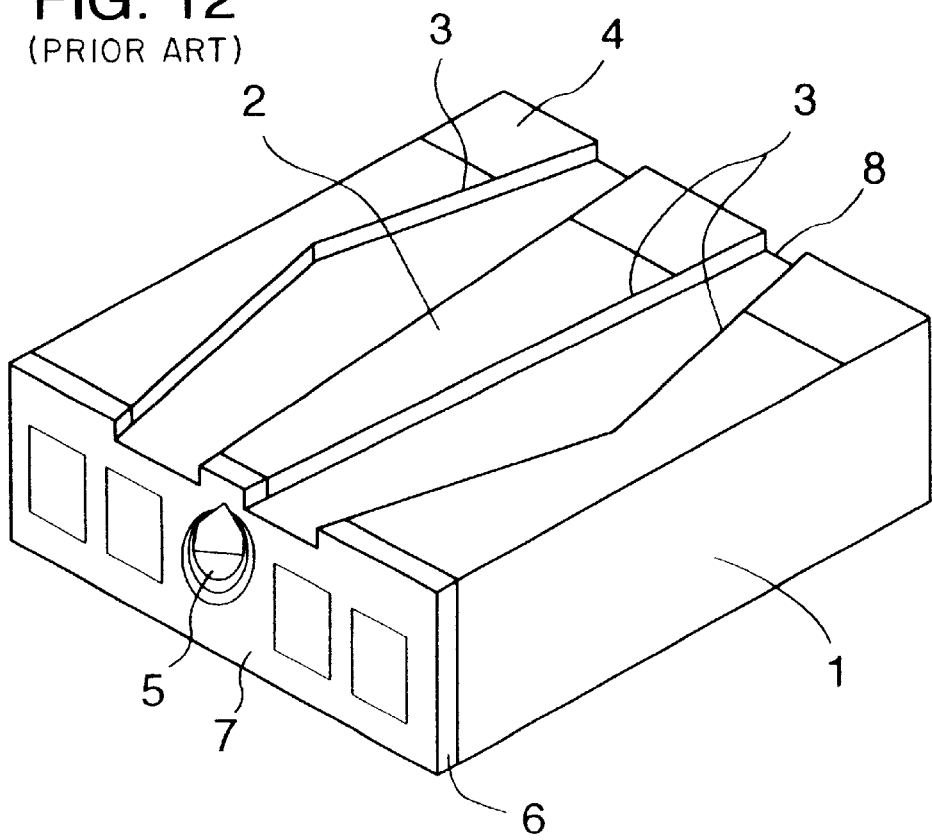
FIG. 12 is a view showing a magnetic head slider of the non-linear shape known heretofore.
Figure 13A:
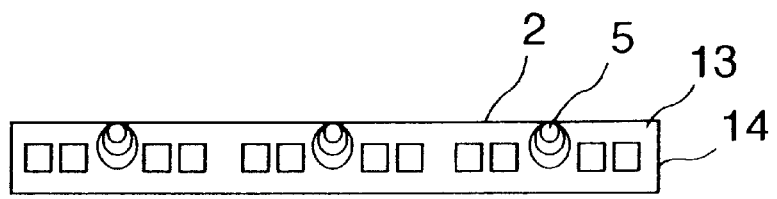
FIG. 13 is a view illustrating a method of manufacturing a conventional magnetic head slider known heretofore
Figure 13B:
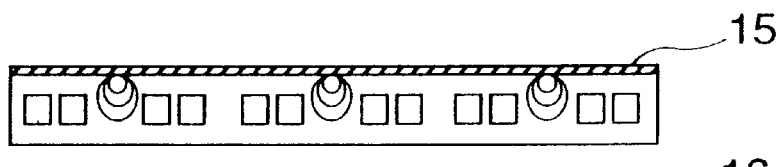
Figure 13C:
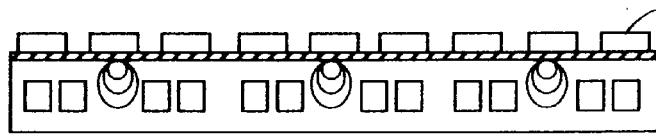
Figure 13D:
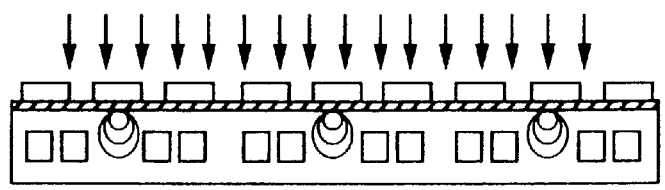
Figure 13E:
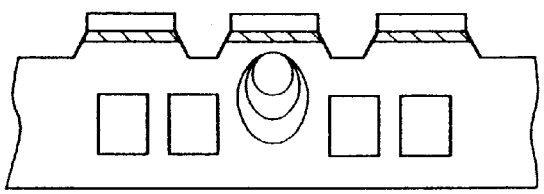
Figure 13F:
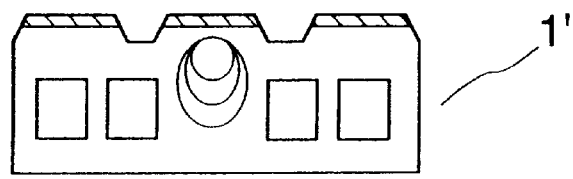

In FIG. 8, numeral 1 denotes a magnetic head, 25 denotes a head polishing jig, 22 denotes a rotatable turn table and 23 denotes a polishing liquid. The magnetic head 1 is mounted on the head polishing jig 25, whereon the polishing of the floating surface 2 is carried out for ten minutes or so while supplying the polishing liquid 23 to the rotating turn table 22. The floating surface is polished by ca. 0.24 μm through the flatness correcting polishing process, whereby the deformation of the floating surface is corrected to a plane surface or a slightly convex surface, as is shown in FIG. 7 at (*b*). Furthermore, the sectional shape of the rail corner portion or edge surface is such that the inclined surface 9 is slightly diminished when compared with that shown in FIG. 6 at (*a*) with the width of ca. 0.5 μm and the height of ca. 0.25 μm, as is shown in FIG. 6 at (*b*), because the floating surface is polished only slightly. Further, the protecting film remains in the state not polished. In succession to the flatness correcting polishing process of the floating surface, the individual magnetic heads are fixed to the head polishing jig 26 shown in FIG. 9 for the cleaning thereof, whereon the protecting film is formed on the floating surface through a sputtering or CVD process. After the film formation, the magnetic heads are removed from the head fixing jig 26 to be finished, as shown in FIG. 2.

Sectional shape of the corner portion of the rail of the magnetic head slider formed through the process described above is shown in FIG. 6 at (*c*). The minute inclined surface 9 exists in the corner portion of the rail. The inclined surface 9 is of such size that the width thereof is ca. 0.5 μm with the height being 0.25 μm. Further, the angle formed between the inclined surface and the floating surface is ca. 27 degrees and the ratio of the area occupied by the inclined surface to that of the rail is ca. 0.6%. The bottom surface of the rail formed through the process described above presents a surface roughness of ca. 0.2 µm or less. The rail width as well as the rail groove depth undergoes no change before and after the re-deposited particulate removing polishing process.

Figure 14:
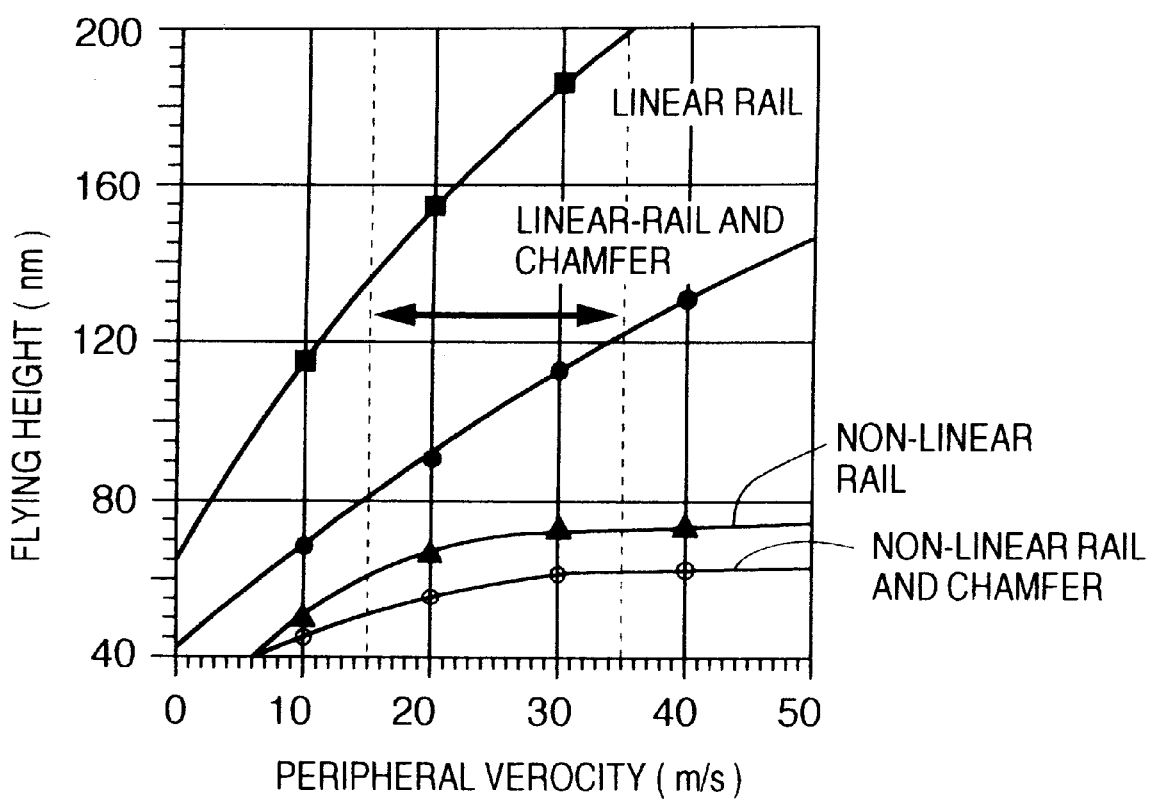
FIG. 14 is a view showing relations between peripheral velocity and flying height of the magnetic head slider.

As is apparent from the foregoing description, by carrying out the re-deposited particulate removing polishing process after the ion milling process, the re-deposited particulates on the side walls of the rail and the floating surface can be removed completely, with the minute inclined surface being formed. Because of the complete elimination of the re-deposition, there will never take place such unwanted events that the projections constituted by the re-deposited particulates injure the disk and/or the re-deposited particulates as dropped off cause error to occur in the read/write operation. In the case where the chamfered portion is formed in the rail of non-linear shape, the flying height is within a range of ca. 50 to 60 nm when the disk is operated at the peripheral velocity ranging from 15 to 35 m/s, wherein difference of the flying height between inner and outer peripheries of the disk is decreased to ca. 10 nm, as can be seen from FIG. 14. Thus, both the flying height and the difference of the flying height are suppressed to a low level when compared with the case where there is provided no chamfered portion. To say in another way, provision of the minute inclined surface can not only reduce the flying height but also suppress the variation of the flying height ascribable to the difference in the peripheral velocity between the inner and outer peripheries of the disk, to an advantageous effect. Furthermore, because the inclined surface is formed also at the air stream exit end, shock between the magnetic disk and the magnetic head upon starting/stopping of the magnetic disk is mitigated while damage to both the magnetic disk and the magnetic head is prevented. Thus, by installing the magnetic head slider according to the present invention on a magnetic disk apparatus, there can be provided a magnetic disk apparatus in which the flying height is low and scarcely undergoes variation, and ensuring thus high reliability.

Example 1 for Comparison

A process for manufacturing a conventional magnetic head slider of non-linear shape will be described by reference to FIG. 13.

The steps up to the formation of the resist mask are utterly same as those of the first exemplary embodiment shown in FIG. 1 at (*a*) to (*d*). The ion milling is carried out under the conditions mentioned below. In the first step of the ion milling, argon is used as the ion milling gas, wherein the flow rate is 10 sccm, vacuum is 0.2 Pa, the beam current density is 0.8 mA/cm$^2$, the accelerating voltage is 900 V, the beam incidence angle is 0°, and the process time is 430 minutes. In the second step of the ion milling, argon is used as the ion milling gas, wherein the flow rate is 10 sccm, vacuum is 0.2 Pa, the beam current density is 0.8 mA/cm$^2$, the accelerating-voltage is 900 V, the beam incidence angle is 30°, and the process time is 140 minutes.

The re-deposited particulates exist over the side walls of the resist and the alumina-titanium-carbide substrate after the ion milling mentioned above, as is shown in FIG. 5 at (*a*). The resist is removed after the ion milling, whereon the block is cut into individual sliders (*f*). Thus, the magnetic head slider 1' is finished. The sectional shape of the rail of the magnetic head slider manufactured through the conventional process is such as shown in FIG. 5 at (*b*). By removing the resist, a major part of the re-deposited articulates is removed together with the resist. However, a part of the re-deposited articulates is not removed but continues to remain on the floating surface, wherein the height of such residual re-deposition is ca. 0.5 µm. The presence of such re-deposited particulates existing on the floating surface may scratch the magnetic disk upon starting/stopping of the magnetic disk apparatus, which provides a cause for error. Furthermore, the re-deposited particulates may drop off on the magnetic disk due to the contact with the disk, which may provide a cause for error. Furthermore, in the case of the magnetic head slider of a low floating level, the height of a mass of the re-deposited particulates may become comparable to the flying height, which can significantly impede the floating stability.

No inclined surface exists in the corner portion of the rail of the magnetic head slider as manufactured by the conventional process described above. Besides, the protecting film of the inclined surface has a same film thickness at the end of the inclined surface and at the center portion of the same. In that case, the bottom surface of the rail presents a surface roughness of ca. 0.7 µm.

Exemplary Embodiment 2

A second exemplary embodiment of the present invention is similar to the first exemplary embodiment so far as the steps up to the formation of the rail by the ion milling inclusive is concerned. The re-deposited particulate removing polishing process is carried out under the conditions mentioned below. The turn table 22 and the polishing cloth 17 each having a diameter of 300 mm are used, wherein the chuck 21 and the turn table 22 are rotated in the same direction at a speed of 20 rpm, the chuck 20 is oscillated with an amplitude or width of 10 mm at an oscillation speed of 5 mm/sec under application of the polishing pressure of 10 kPa at the mean polishing rate of 80 mm/sec, a non-woven polyester fabric is used as the polishing cloth 17 with water being used as the polishing liquid 23 and dropped or supplied at the rate of 10 ml/min. The polishing time is 10 minutes.

A sectional shape of a corner portion of the rail undergone the above-mentioned re-deposited particulate removing polishing process is shown in FIG. 15 at (*a*).

Figure 15A:
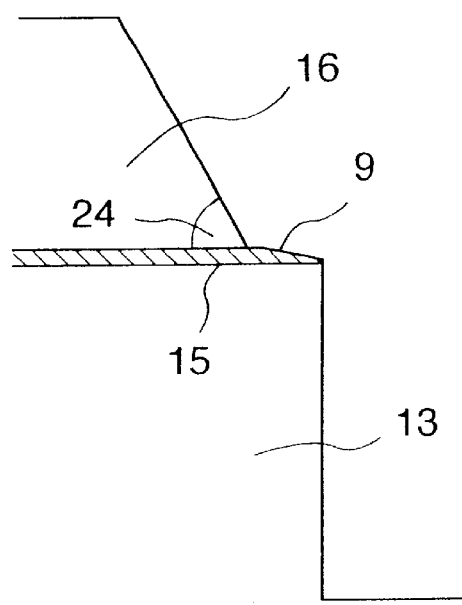
FIG. 15 is an enlarged sectional view showing a magnetic head slider according to a second exemplary embodiment of the present invention.
Figure 15B:
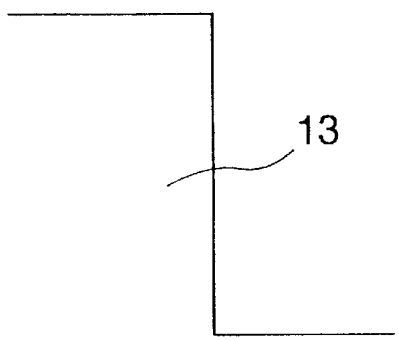
Figure 15C:
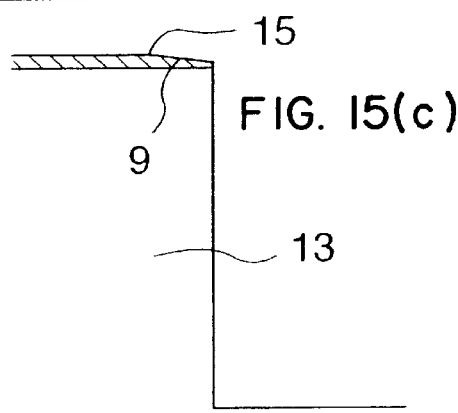
Figure 15D:
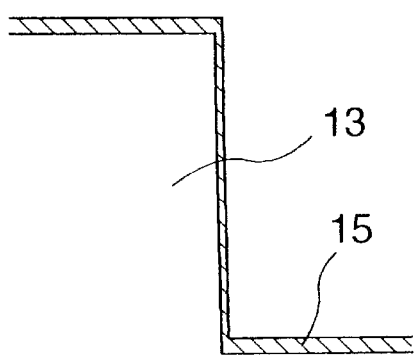
Figure 15E:
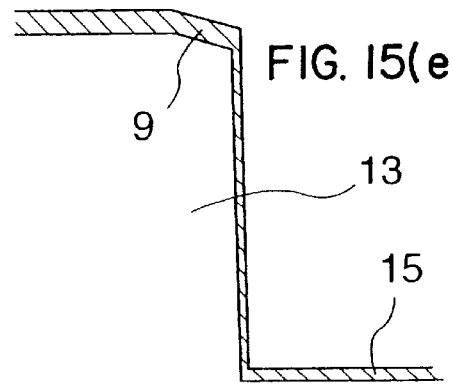

Comparison with the state before the polishing shown in FIG. 5 at (*a*) shows that the re-deposited particulates are removed away perfectly, the taper angle 24 becomes smaller when compared with the taper angle before the polishing with the resist being retracted from the position before the polishing. Further, a minute inclined surface is formed at the corner portion of the rail and has a size of ca. 1 µm in width with the height being ca. 0.002 µm. After the re-deposited particulate removing polishing process, the resist is removed, and the block is delaminated from the head block fixing jig, whereon the block is cut into individual magnetic heads 1 shown in FIG. 1 at (*g*). Additionally, the flatness correcting polishing process is carried out for correcting deformation of the head, similarly to the first exemplary embodiment. Sectional shapes of the rail corner portion after the process are shown in FIG. 15 at (*b*) and (*c*). More specifically, FIG. 15(*b*) shows a sectional shape of the rail at a center portion of the magnetic head, while FIG. 15(*c*) shows a sectional shape of the tapered portion 4 of the magnetic head shown in FIG. 2 in the vicinity of the air stream exit end. Through the flatness correcting polishing process, the floating surface is polished away about 0.2 µm, as a result of which the inclined surface produced by the re-deposited particulate removing polishing process and the protecting film are removed by the polishing with the floating surface being made substantially flat, as is shown in FIG. 15 at (a). However, in the vicinity of the air stream exit end formed by the tapered end portion polished to ca. 0.7 degree, the height is lower than the floating surface about 2.4 µm. Thus, the tapered end portion is not removed through the re-deposited particulate removing polishing process. Consequently, in the vicinity of the air stream exit end, the sectional shape of the rail undergoes no change when compared with the state before the flatness correcting polishing process shown in FIG. 15 at (a), as can be seen in FIG. 15(b). In succession to the flatness correcting polishing process of the floating surface, a protecting film is formed, as described hereinbefore in conjunction with the first exemplary embodiment, whereby the magnetic head is finished. Sectional shapes of the corner portions of the rail of the magnetic head slider formed through the process described above are shown in FIG. 15 at (d) and (e). More specifically, FIG. 15(d) shows a sectional shape of the rail at a center portion of the magnetic head, and FIG. 15(e) shows a sectional shape of the rail in the vicinity of the air stream exit end, similarly to FIG. 15 at (c). As can be seen in FIG. 15 at (d), no inclined surface exist in the corner portion of the rail on the floating surface except for the tapered portion. However, in the vicinity of the air stream exit end, a minute inclined surface 9 exists in the corner portion of the rail. The inclined surface 3 is of such size that the width thereof is ca. 1 µm with the height being 0.002 µm. Further, the angle formed between the inclined surface and the floating surface is ca. 0.1 degree, and the ratio of the area occupied by the inclined surface to that of the rail is ca. 0.1%. The bottom surface of the rail formed through the process described above presents a surface roughness of ca. 0.7 µm. The rail width as well as the rail groove depth undergoes no change before and after the redeposited particulate removing polishing process.

As is apparent from the foregoing description, by carrying out the re-deposited particulate removing polishing process by using water as the polishing liquid after the ion milling, the re-deposited particulates on the side walls of the rail and the floating surface can be removed completely, whereby occurrence of defect due to the re-deposited particulates can be suppressed, as in the case of the first exemplary embodiment. The inclined surface formed through the re-deposited particulate removing polishing process carried out by using water as the polishing liquid has a low height corresponding to 1/100 or less of the height of the inclined surface formed by using the diamond slurry as the polishing liquid. As a consequence, the minute inclined surface is removed except for the tapered portion through the succeeding flatness correcting polishing process. Consequently, the area of the inclined surface is extremely small relative to the area of the rail and thus less effective for enhancing the floating characteristics. However, because the inclined surface is formed at the air stream exit end, shock between the magnetic disk and the magnetic head upon starting/stopping of the magnetic disk is mitigated, whereby the reliability of the magnetic disk apparatus can be enhanced, to an advantageous effect.

Exemplary Embodiment 3

A third exemplary embodiment of the present invention is similar to the first exemplary embodiment so far as the process up to the step of forming the rail by the ion milling inclusive is concerned. The re-deposited particulate removing polishing process is carried out under the conditions mentioned below. The turn table 22 and the polishing cloth 17 each having a diameter of 300 mm are used, wherein the chuck 21 and the turn table 22 are rotated in the same direction at a speed of 20 rpm, the chuck 20 is oscillated with an amplitude or width of 10 mm at an oscillation speed of 5 mm/sec under application of the polishing pressure of 20 kPa at the mean polishing rate of 80 mm/sec, a non-woven polyester fabric is used as the polishing cloth 17 with water being used as the polishing liquid 23 and dropped at the rate of 10 ml/min. The polishing time is 30 minutes.

Figure 16A:
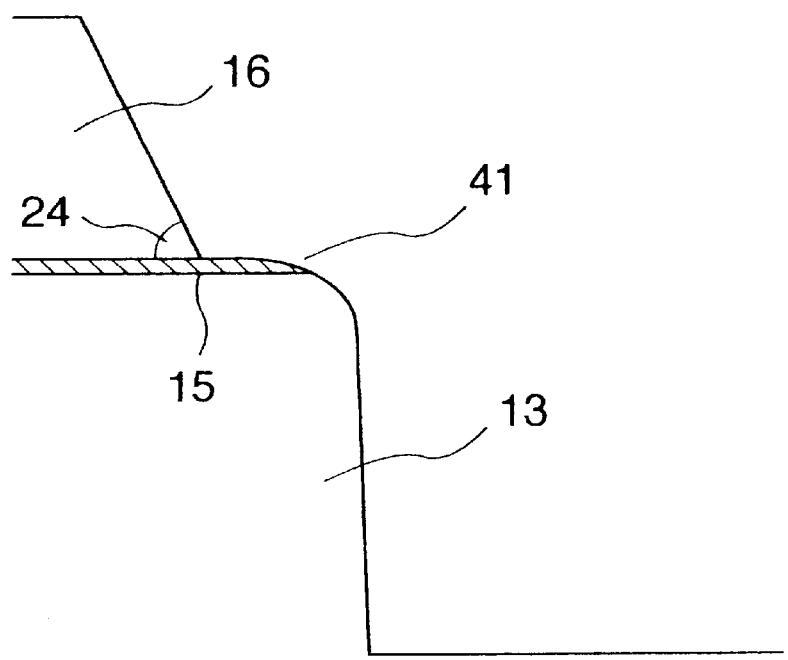
FIG. 16 is an exploded sectional view showing a magnetic head slider according to a third exemplary embodiment.
Figure 16B:
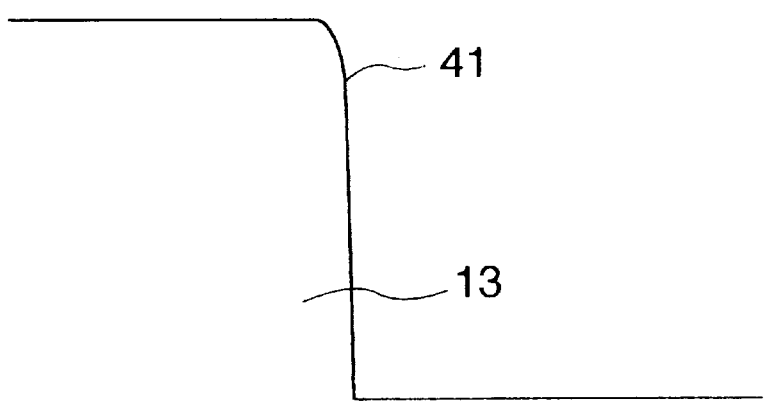
Figure 16C:
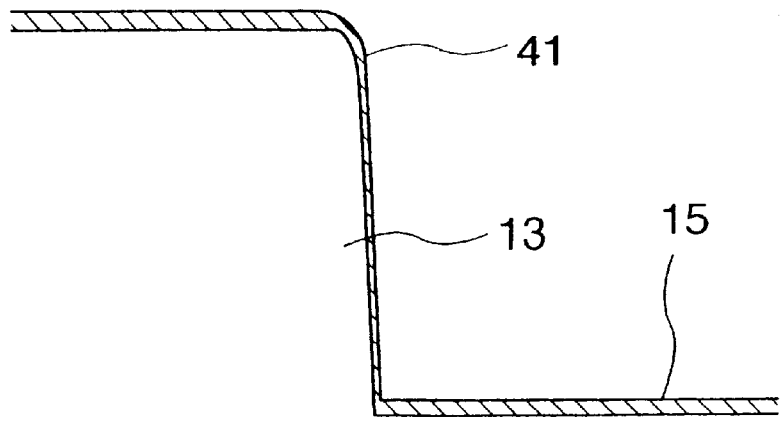

A sectional shape of a corner portion of the rail undergone the above-mentioned re-deposited particulate removing polishing process is shown in FIG. 16 at (a). Comparison with the state before the polishing as shown in FIG. 5 at (a) shows that the re-deposited particulates are removed away perfectly, the taper angle 24 becomes smaller when compared with the taper angle before the polishing with the resist being retracted from the position before the polishing. Further, a minute curved surface 41 is formed at the corner portion of the rail and has a size of ca. 2 µm in width with the height being ca. 1.5 µm. After the re-deposited particulate removing polishing process, the resist is removed, and the block is delaminated from the head block fixing jig, whereon the block is cut into individual magnetic heads 1 shown in FIG. 1 at (g). Additionally, the flatness correcting polishing process is carried out for correcting deformation of the head, as in the case of the first exemplary embodiment. A sectional shape of the rail corner portion after the polishing process is shown in FIG. 16 at (b). As can be seen in FIG. 16 at (b), the sectional shape of the rail corner portion is such that the curved surface 41 is slightly decreased when compared with that shown in FIG. 16 at (a) and has the width of ca. 1.7 µm and the height of ca. 1.3 µm. This is because the floating surface is polished only slightly. Further, the protecting film remains in the state not polished. In succession to the flatness correcting polishing process of the floating surface, a protecting film is formed, as described hereinbefore in conjunction with the first exemplary embodiment, whereupon fabrication of the magnetic head is finished.

Sectional shape of the corner portion of the rail of the magnetic head slider formed through the process described above is shown in FIG. 16 at (c). A minute curved surface 41 exists in the corner portion of the rail. The inclined surface 3 is of such size that the width thereof is ca. 1.7 µm with the height being 1.3 µm. Further, the ratio of the area occupied by the inclined surface to that of the rail is ca. 1.2%. The bottom surface of the rail formed through the process described above presents a surface roughness of ca. 0.2 µm.

As is apparent from the foregoing description, by carrying out the re-deposited particulate removing polishing process after the ion milling, the re-deposited particulates on the side walls of the rail and the floating surface can be removed completely, whereby defect due to the re-deposited particulates is suppressed, as in the case of the first exemplary embodiment. Further, owing to the formation of the inclined surface at the corner portion of the rail, as is in the case of the first exemplary embodiment, floating characteristic is enhanced. Furthermore, because the inclined surface is formed also at the air stream exit end, shock between the magnetic disk and the head upon starting/stopping of the disk is mitigated, whereby the reliability of the magnetic disk apparatus can be enhanced.

Exemplary Embodiment 4

A fourth exemplary embodiment of the present invention is similar to the first exemplary embodiment so far as the process up to the step of forming the rail by the ion milling inclusive is concerned. The re-deposited particulate removing polishing process is carried out under the conditions mentioned below. The turn table 22 and the polishing cloth 17 each having a diameter of 300 mm are used, wherein the chuck 21 and the turn table 22 are rotated in the same direction at 20 rpm, the chuck 20 is oscillated with an amplitude of 10 mm at an oscillation speed of 5 mm/sec under application of the polishing pressure of 10 kPa at the mean polishing rate of 80 mm/sec, a non-woven polyester fabric is used as the polishing cloth 17 with water being used as the polishing liquid 23 and dropped at the rate of 10 ml/min. The polishing time is 10 minutes.

Figure 17A:
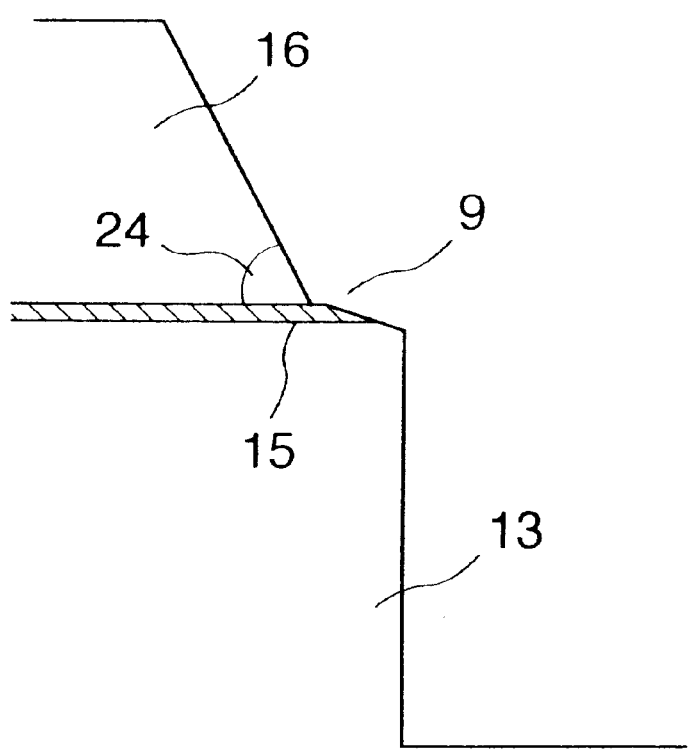
FIG. 17 is an enlarged sectional view showing a magnetic head slider according to a fourth exemplary embodiment.
Figure 17B:
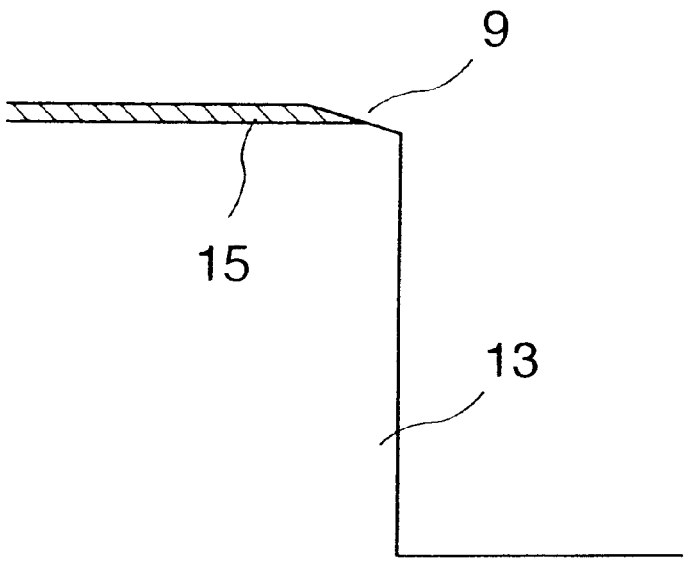
Figure 18A:
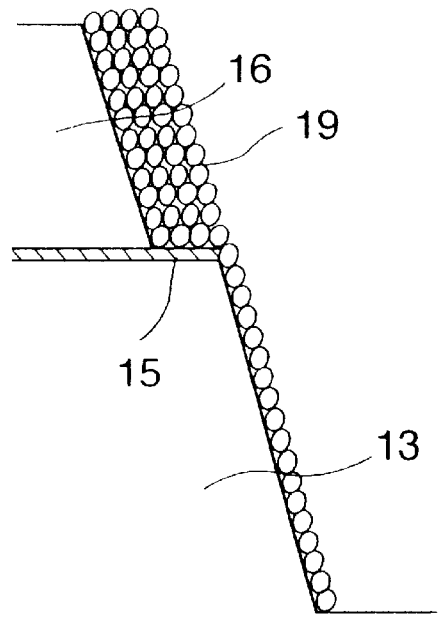
FIG. 18 is an enlarged sectional view showing a magnetic head slider according to a fifth exemplary embodiment.
Figure 18B:
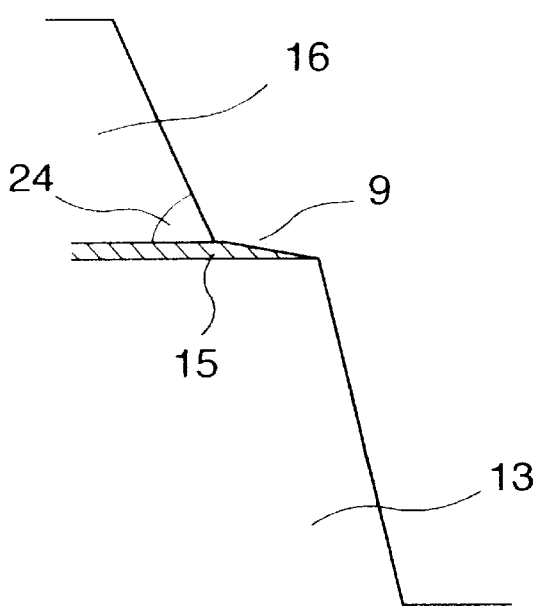
Figure 18C:
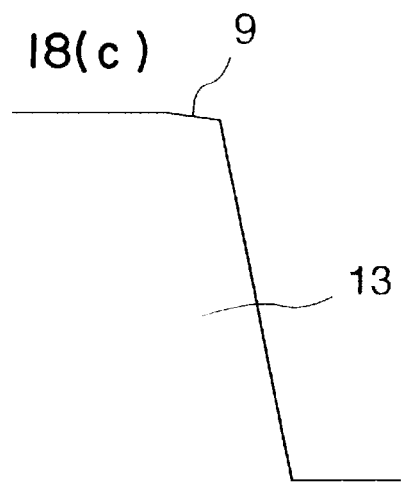
Figure 18D:
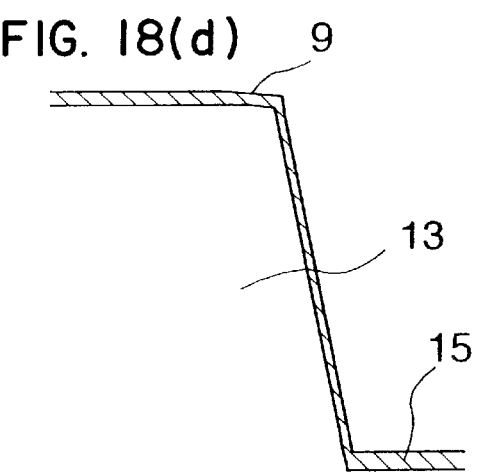

A sectional shape of a corner portion of the rail undergone the above-mentioned re-deposited particulate removing polishing process is shown in FIG. 17 at (a). Comparison with the state before the polishing shown in FIG. 5 at (a) shows that the re-deposited particulates are removed away perfectly, the taper angle 24 becomes smaller when compared with the taper angle before the polishing with the resist being retracted from the position before the polishing.

Further, a minute inclined surface is formed at the corner portion of the rail and has a size of ca. 1 μm in width with the height being ca. 0.002 μm. Further, the protecting film of the inclined surface is caused to be thin in the thickness due to the polishing process. After the re-deposited particulate removing polishing process, the resist is removed and the block is delaminated from the head block fixing jig whereon the block is cut into individual magnetic heads 1 shown in FIG. 1 at (g). The flatness correcting polishing 10 process is not carried out in this case.

The sectional shape of the corner portion of the rail of the magnetic head slider formed through the process described above is illustrated in FIG. 17 at (b), wherein a minute inclined surface 9 exists. The inclined surface 9 is of such size that the width thereof is ca. 1 μm with the height being 0.002 μm. Additionally, film thickness at the end of the inclined surface of the protecting film formed on the floating surface is thin when compared with that of the center portion of the rail. Further, the angle formed between the inclined surface and the floating surface is ca. 0.1 degree, and the ratio of the area occupied by the inclined surface to that of the rail is ca. 0.1%. The bottom surface of the rail formed through the process described above presents a surface roughness of ca. 0.7 μm. Neither the rail width nor the rail groove depth undergoes any change before and after the re-deposited particulate removing polishing process.

As is apparent from the foregoing description, by carrying out the re-deposited particulate removing polishing process by using water as the polishing liquid after the ion milling, the re-deposited particulates on the side walls of the rail and the floating surface can be removed completely, whereby defect due to the re-deposited particulates is suppressed, as in the case of the first exemplary embodiment. Furthermore, owing to the formation of the inclined surface at the corner portion of the rail, as is in the case of the first exemplary embodiment, floating characteristic is enhanced. Additionally, because the inclined surface is formed at the air stream exit end as well, shock between the disk and the head upon starting/stopping of the magnetic disk is mitigated, whereby the reliability of the magnetic disk apparatus can be enhanced.

Exemplary Embodiment 5

Figure 20:
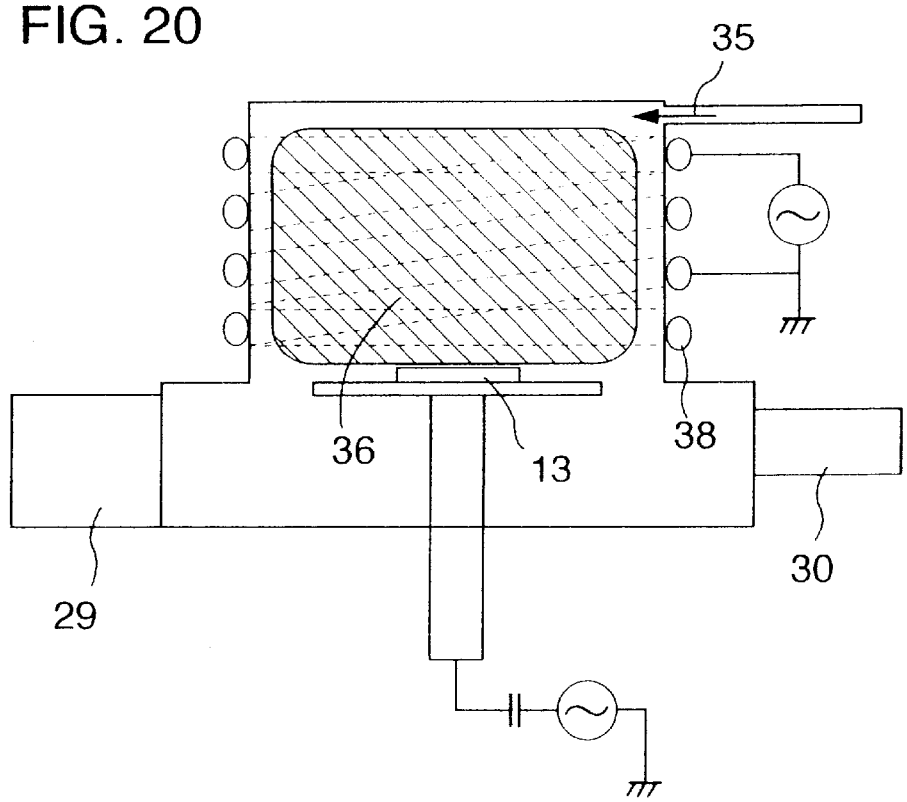
FIG. 20 is a diagram showing a structure of an RIE apparatus.
Figure 21A:
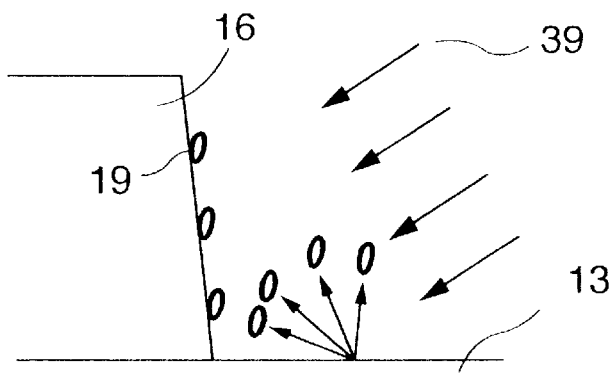
FIG. 21 is a conceptual view illustrating formation of re-deposition.
Figure 21B:
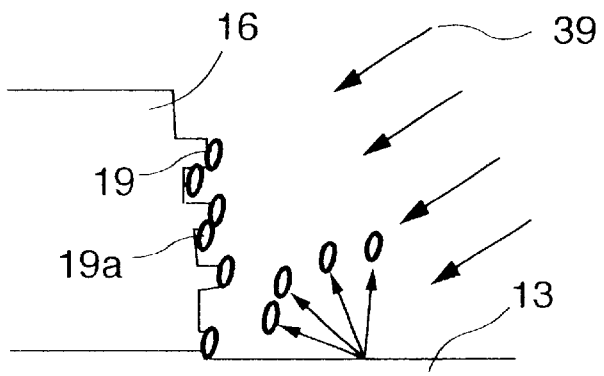
Figure 22:
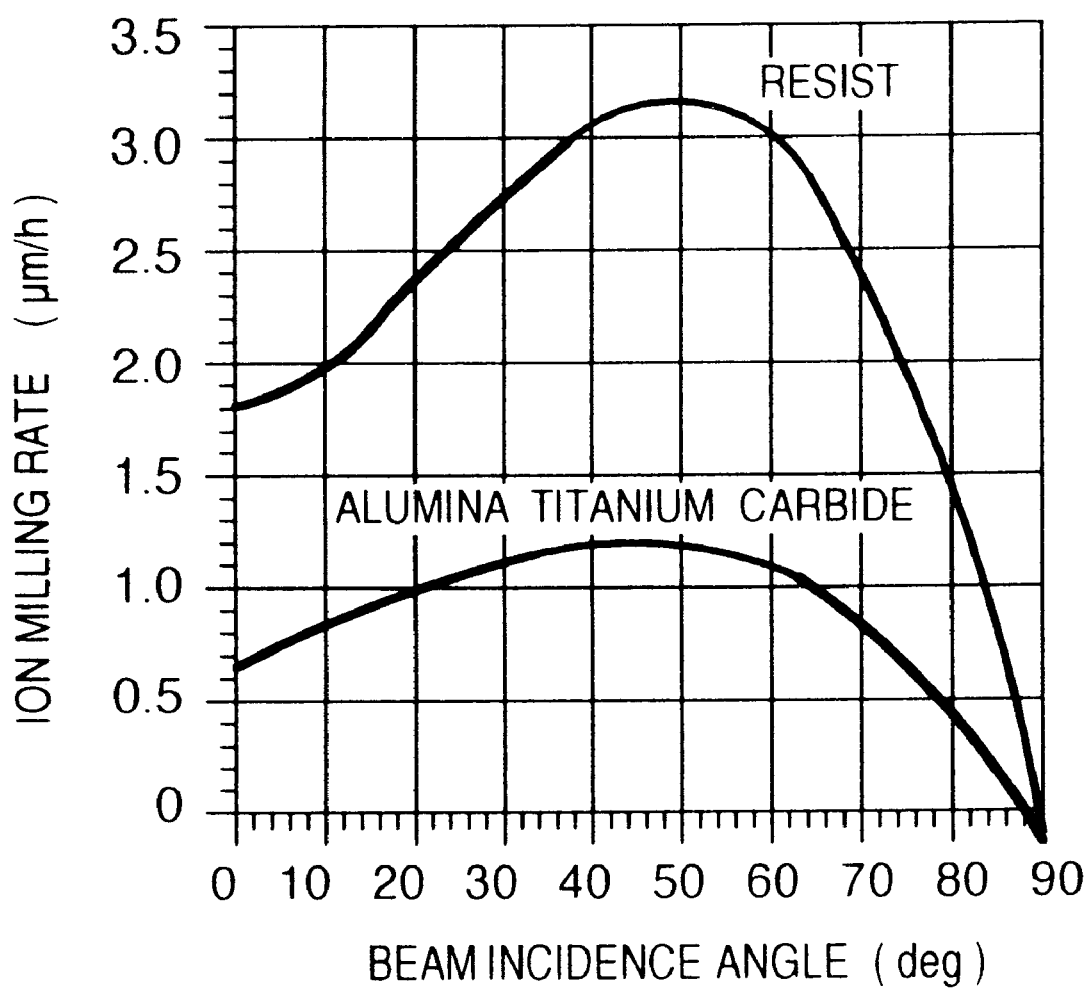
FIG. 22 is a diagram showing relation between ion beam incidence angle and ion milling rate.
Figure 23A:
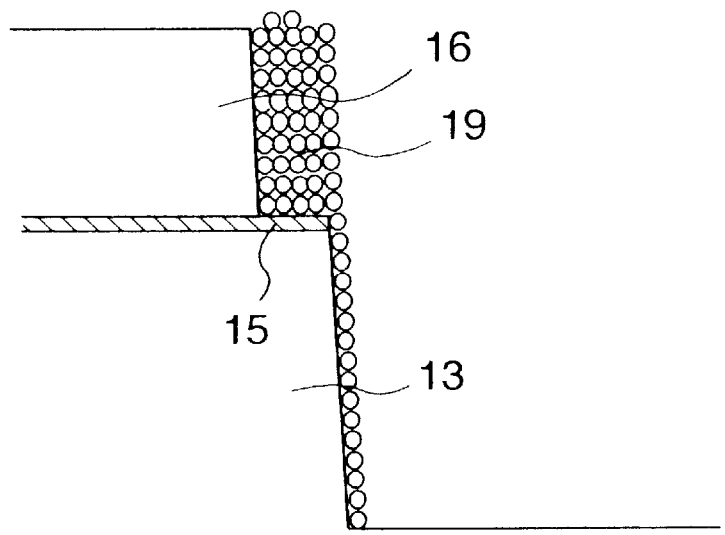
FIG. 23 is an enlarged sectional view showing a conventional magnetic head slider known heretofore.
Figure 23B:
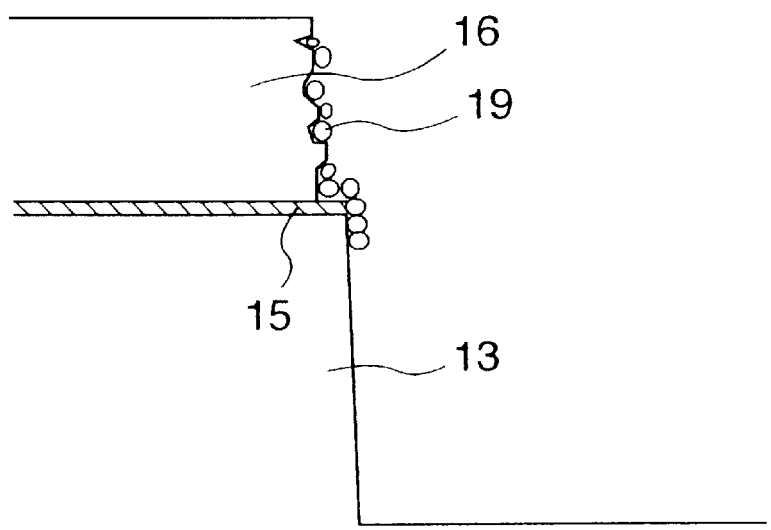
Figure 23C:
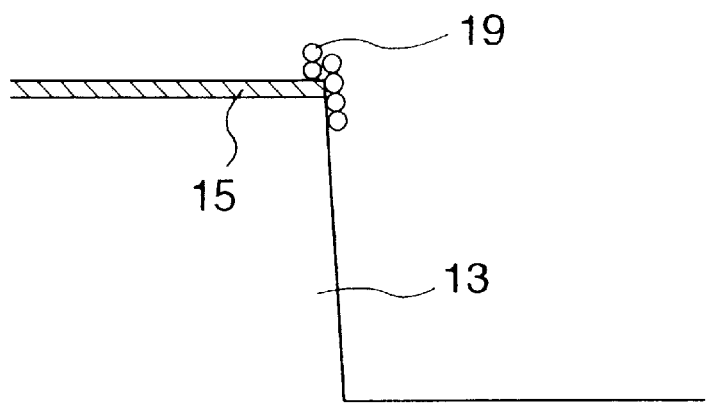

A fifth exemplary embodiment of the present invention will be described by reference to FIG. 1. The fifth exemplary embodiment of the invention is similar to the first exemplary embodiment so far as the process up to the step of forming the resist shown in FIG. 1 at (c), and the etching process described below is carried out. In the fifth exemplary embodiment, the etching process is realized by a reactive ion etching process (hereinafter referred to also as the RIE). FIG. 20 shows a high frequency induction type RIE apparatus known heretofore. In FIG. 20, numeral 13 denotes an alumina-titanium-carbide substrate, 29 denotes a vacuum pump, 30 denotes a specimen exchanging chamber, 35 denotes a gas introducing port, 36 designates plasma and 38 denotes a coil. The apparatus now concerned features a high plasma density when compared with the prior art RIE apparatus. An etching gas is fed through the gas introducing port 35 with the plasma 36 being excited by applying a high frequency electric power to the coil 38 while a bias voltage is applied to the substrate, whereby ions are caused to impinge into the substrate to effectuate the process. For the RIE process, a mixed gas of SF6 gas and argon is used, wherein the flow rate is 15 sccm, vacuum is 0.5 Pa, the bias voltage is 500 V, and the process time is 100 minutes.

The groove depth of the rail 3 formed in this way is about 10 μm (e). The sectional shape of the rail thus formed is shown in FIG. 18 at (a). The re-deposited particulates 19 exist over the whole side walls of the alumina-titanium-carbide substrate and the resist. Accordingly, the polishing process (f) is performed by using the polishing cloth 17 after the RIE process, to thereby remove the re-deposited particulates produced during the RIE process. The polishing process is carried out under the conditions mentioned below, as is in the case of the exemplary embodiment 1. The turn table 22 and the polishing cloth 17 have respective diameters of 300 mm, the chuck 21 and the turn table 22 are rotated in the same direction at 20 rpm, the chuck 20 is oscillated with an amplitude of 10 mm at the oscillation speed of 5 mm/sec, the polishing pressure is 10 kPa, the mean polishing rate is 80 mm/sec, non-woven polyester fabric is used as the polishing cloth 17, and a slurry containing diamond grains having a particle size of 0.25 μm on an average is used and dropped at a rate of 10 ml/min. The polishing time is 10 minutes.

The sectional shape of a corner portion of the rail undergone the above-mentioned re-deposited particulate removing polishing process is shown in FIG. 18 at (b). Comparison with the state before the polishing as shown in FIG. 18 at (a) shows that the re-deposited particulates are removed away perfectly, the taper angle 24 becomes smaller when compared with that before the polishing, and the resist is retracted from the position before the polishing. Further, a minute inclined surface is formed at the corner portion of the rail and has a size of ca. 1 μm in width with the height being ca. 0.5 μm. After the re-deposited particulate removing polishing process, the resist is removed, and the block is delaminated from the head block fixing jig, whereon the block is cut into individual magnetic heads 1 shown in FIG. 1 at (g). Additionally, the flatness correcting polishing process is carried out for correcting deformation of the head, as in the case of the first exemplary embodiment. The sectional shape of the rail corner portion after the polishing process is shown in FIG. 18 at (c). The sectional shape of the rail corner portion is such that the inclined surface is slightly reduced when compared with that shown in FIG. 18 at (b) with the width of cd. 0.5 μm and the height of ca. 0.25 μm, as shown in FIG. 18 at (c). The floating surface is polished only slightly. Further, the protecting film remains in the state not polished. In succession to the floating surface correcting polishing process of the floating surface, a protecting film is formed, as described hereinbefore in conjunction with the first exemplary embodiment, whereby the magnetic head is finished.

The sectional shape of the corner portion of the rail of the magnetic head slider formed through the process described above are shown in FIG. 18 at (d). The minute inclined surface 9 exists and has such size that the width of the inclined surface 3 is ca. 0.5 μm with the height being 0.25 μm. Further, the angle formed between the inclined surface and the floating surface is 27 degrees, and the ratio of the area occupied by the inclined surface to that of the rail is ca. 0.6%. The bottom surface 6f the rail formed through the process described above presents a surface roughness of ca. 0.2 μm or less. The rail width as well as the rail groove depth undergoes no change before and after the re-deposited particulate removing polishing process.

As is apparent from the foregoing description, by carrying out the re-deposited particulate removing polishing process after the RIE, the re-deposited particulates on the side walls of the rail and the floating surface can be removed completely, whereby defect ascribable to the re-deposited particulates is suppressed, as in the case of the first exemplary embodiment. Further, owing to the formation of the inclined surface at the corner portion of the rail, as is in the case of the first exemplary embodiment, floating characteristic can be enhanced. Furthermore, because the inclined surface is formed at the air stream exit end as well, shock between the disk and the head upon starting/stopping of the magnetic disk is mitigated, whereby the reliability of the magnetic disk apparatus can be enhanced.

INDUSTRIAL APPLICABILITY

According to the invention, the re-deposited particulates adhering to the floating surfaces of the rails can be completely removed, and moreover the stability of the floating attitude can be enhanced owing to provision of the minute inclined surfaces. Thus, the magnetic disk apparatus of high reliability can be realized.

What is claimed is:

1. A magnetic head slider including a plurality of rails of non-linear shape at a floating surface with respect to a magnetic disk, each rail of non-linear shape being a processed rail of one of reactive ion etched rail, sputter etched rail and ion milled processed rail, and side walls of the rails being polished side walls, each rail having a longitudinal extension direction substantially in a direction of rotation of the magnetic disk, a protective film provided on a floating surface of at least one of said rails, wherein a thickness of said protective film at least in a direction transverse to the longitudinal extension direction of said at least one of said rails is not uniform in the transverse direction.

* * * * *